United States Patent
Yamamoto et al.

(10) Patent No.: US 11,550,147 B2
(45) Date of Patent: Jan. 10, 2023

(54) OPTICAL SCANNING DEVICE, IMAGE FORMING APPARATUS INCLUDING OPTICAL SCANNING DEVICE, AND OPTICAL SCANNING METHOD

(71) Applicant: SHARP KABUSHIKI KAISHA, Sakai (JP)

(72) Inventors: Hiroshi Yamamoto, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/550,599

(22) Filed: Dec. 14, 2021

(65) Prior Publication Data
US 2022/0244529 A1     Aug. 4, 2022

(30) Foreign Application Priority Data
Jan. 29, 2021   (JP) .............................. JP2021-013073

(51) Int. Cl.
  *G03G 15/043*   (2006.01)
  *G02B 26/12*    (2006.01)
  *G03G 15/04*    (2006.01)
  *G02B 26/08*    (2006.01)

(52) U.S. Cl.
  CPC ......... *G02B 26/12* (2013.01); *G02B 26/0816* (2013.01); *G03G 15/043* (2013.01); *G03G 15/04036* (2013.01)

(58) Field of Classification Search
  CPC .. G02B 26/0816; G02B 26/12; G02B 26/121; G02B 26/122; G02B 26/123; G03G 15/04036; G03G 15/043
  See application file for complete search history.

(56) References Cited

U.S. PATENT DOCUMENTS

2006/0028533 A1* 2/2006 Nakajima ........ G03G 15/04036
                                                            347/233
2015/0002593 A1* 1/2015 Shirai .............. G03G 15/04072
                                                            347/118

FOREIGN PATENT DOCUMENTS

JP       2006-018078 A       1/2006

* cited by examiner

*Primary Examiner* — Hoang X Ngo
(74) *Attorney, Agent, or Firm* — ScienBiziP, P.C.

(57) ABSTRACT

An optical scanning device according to the present invention has a 2-beam type first laser diode and a 1-beam type second laser diode. When resolution in a sub-scanning direction is 600 dpi, exposure processing is executed by a first laser beam and a second laser beam emitted from the first laser diode. And when the resolution in the sub-scanning direction is 1200 dpi, the exposure processing is executed by the first laser beam and a third laser beam emitted from the second laser diode.

10 Claims, 14 Drawing Sheets

FIG. 5
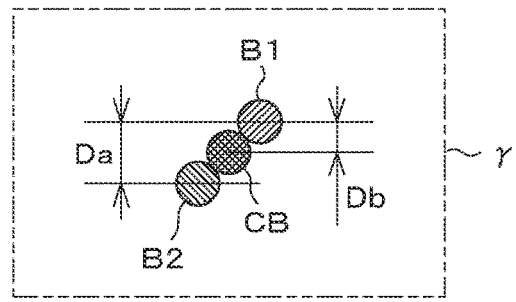
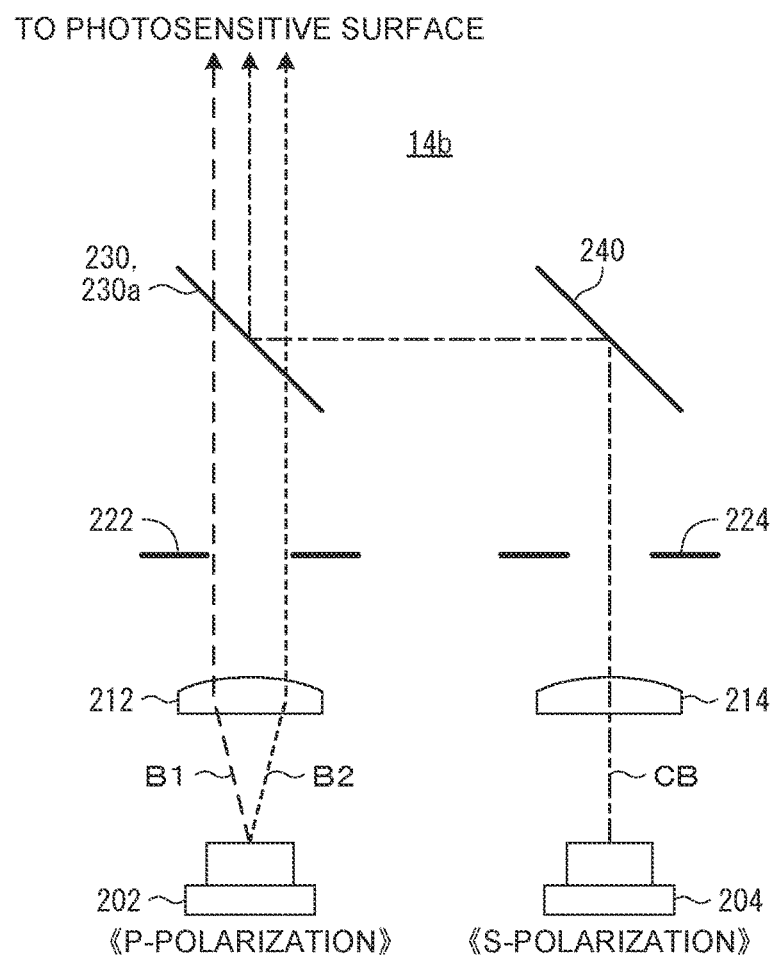
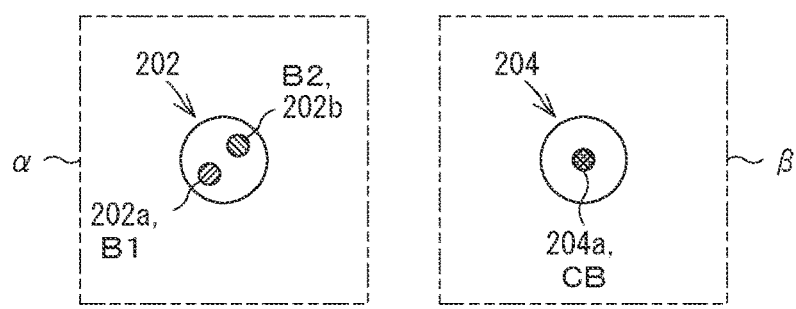

FIG. 14
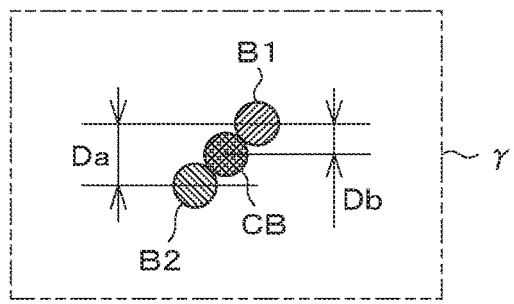
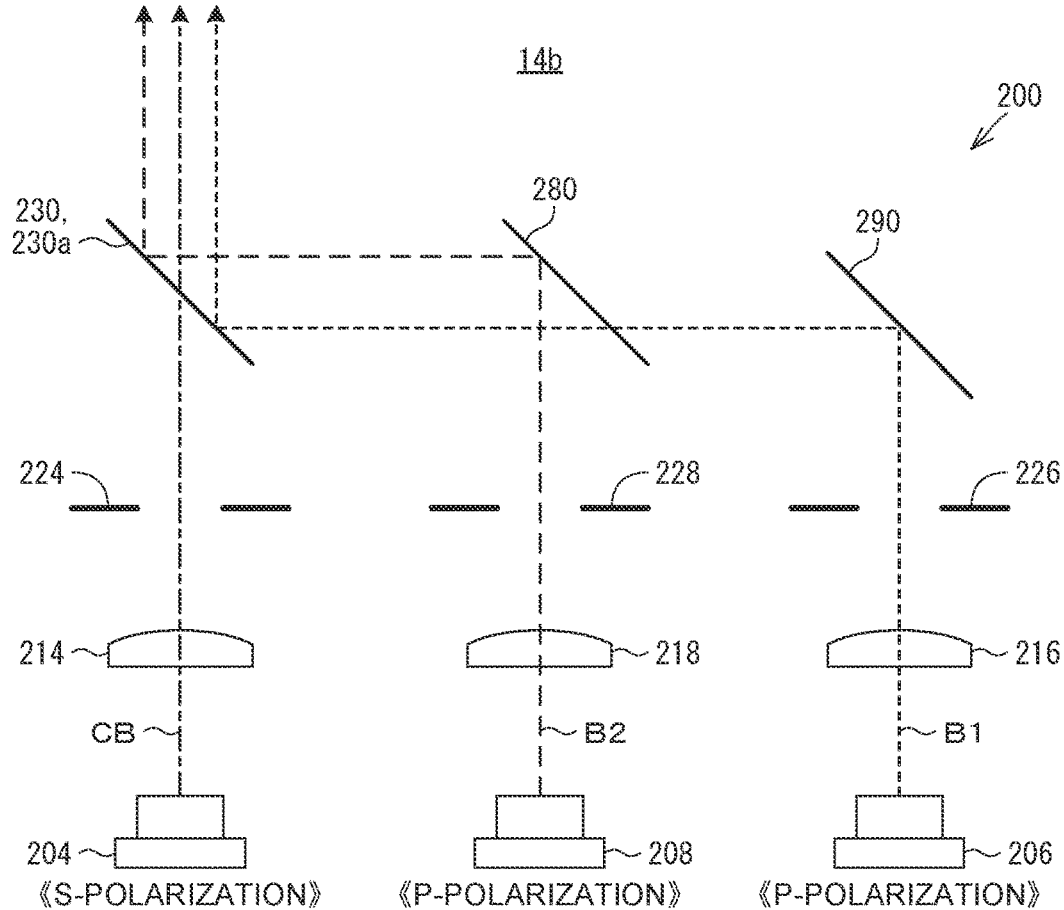
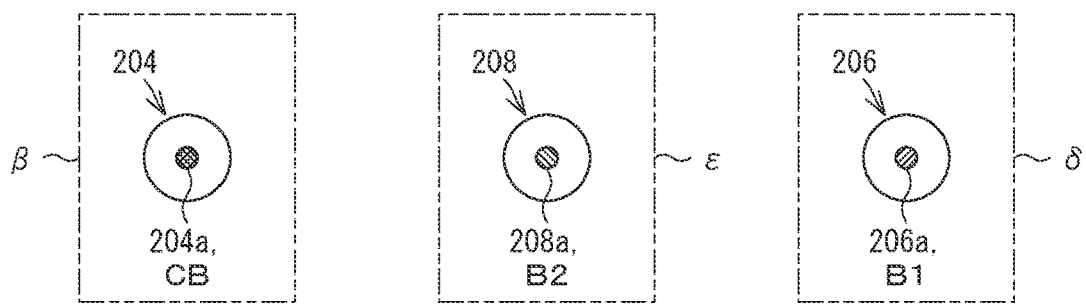

OPTICAL SCANNING DEVICE, IMAGE FORMING APPARATUS INCLUDING OPTICAL SCANNING DEVICE, AND OPTICAL SCANNING METHOD

BACKGROUND OF THE INVENTION

Field of the Invention

The present invention relates to an optical scanning device, an image forming apparatus including the optical scanning device, and an optical scanning method, which are applied to an image forming apparatus of an electrophotographic method.

Description of the Background Art

In an image forming apparatus of the electrophotographic method, image forming processing is executed to form an image based on an image signal on an image recording medium such as paper, and as one process, exposure processing is executed to form a latent image based on the image signal on the surface of a latent image carrier. Specifically, a light source having a light-emitting element that emits a light beam such as a laser diode that emits a laser beam as the light beam, for example, is driven on the basis of an image signal. The laser beam emitted from the light source is emitted to the surface of the latent image carrier such as a photosensitive surface, which is the surface of a substantially cylindrical photosensitive drum, for example, through appropriate optical elements. Here, the photosensitive drum rotates with its center as its axis (rotation axis). As a result, an irradiation position of the laser beam to the photosensitive surface of the photosensitive drum is moved in a rotational direction of the photosensitive drum, that is, scanning is performed. In addition, the irradiation position of the laser beam to the photosensitive surface of the photosensitive drum is also moved, that is, scanning is performed, in the direction along the rotation axis of the photosensitive drum by a deflector, which is one of the optical system elements such as a polygon mirror, for example. Moreover, the photosensitive surface of the photosensitive drum is charged with static electricity in advance or in more detail, by charging processing that is executed as a process prior to the exposure processing. As a result, a latent image, which is a two-dimensional electrostatic image based on an image signal, is formed on the photosensitive surface of the photosensitive drum. The direction along the rotation axis of the photosensitive drum is called a main-scanning direction. And the rotational direction of the photosensitive drum is called a sub-scanning direction.

In the image forming apparatus as above, several technologies have been proposed for switching resolution of a latent image formed by the exposure processing, in particular, in an exposing device which is responsible for the exposure processing, or in more detail, in an optical scanning device which performs scanning with a light beam in the main-scanning direction and in a sub-scanning direction, respectively. For example, Japan Patent Application Publication No. 2006-18078 discloses a technology for switching between first resolution and second resolution by inserting and removing an optical element for switching the resolution in and out of an optical path between the light source and the deflector.

However, the technology disclosed in Japan Patent Application Publication No. 2006-18078 requires an optical element for the aforementioned resolution switching and a drive device for inserting and removing the optical element in and out of the optical path between the light source and the deflector, which makes the configuration of the optical scanning device complex and expensive. In addition, although not specified in Patent Literature 1, in order to increase the resolution in the sub-scanning direction, it is necessary to lower a scanning speed in the sub-scanning direction. When the scanning speed in the sub-scanning direction is lowered as above, the speed of the exposure processing is lowered, which in turn lowers a speed of the image forming processing including the exposure processing or a so-called processing speed.

Therefore, it is an object of the present invention to provide a new optical scanning device, an image forming apparatus including the optical scanning device, and an optical scanning method, in which resolution in the sub-scanning direction can be switched, a degree of lowering of the exposure processing speed due to an increase in the resolution can be suppressed, and this can be realized with a relatively simple and inexpensive configuration.

SUMMARY OF THE INVENTION

In order to achieve this object, the present invention includes a first invention relating to an optical scanning device, a second invention relating to an image forming apparatus including the optical scanning device, and a third invention relating to an optical scanning method.

The first invention according to the optical scanning device among them includes a first light-emitting element, a second light-emitting element and a third light-emitting element. Moreover, the first invention includes a deflector and light-emission controller. The first light-emitting element emits a first light beam. The second light-emitting element emits a second light beam. The third light-emitting element emits a third light beam. Then, the deflector deflects each of the first light beam, the second light beam, and the third light beam so that a scanned surface of a latent image carrier is scanned in the main-scanning direction with each of the first light beam, the second light beam and the third light beam. Moreover, the light-emission controller individually enables or disables an operation of each of the first light-emitting element, the second light-emitting element, and the third light-emitting element. Here, a moving speed of the scanned surface of the latent image carrier in the sub-scanning direction is selectively controlled to be either one of a first speed and a second speed which is lower than the first speed. And the first light-emitting element and the second light-emitting element are disposed such that a mutual distance in the sub-scanning direction between a scanning position of the first light beam and the scanning position of the second light beam on the scanned surface of the latent image carrier is a first distance corresponding to the first speed. In addition, the third light-emitting element is disposed such that the mutual distance in the sub-scanning direction between the scanning position of the first light beam and the scanning position of the third light beam on the scanned surface of the latent image carrier is a second distance corresponding to the second speed. Additionally, the light-emission controller enables the operation of each of the first light-emitting element and the second light-emitting element and disables the operation of the third light-emitting element when the moving speed of the scanned surface of the latent image carrier in the sub-scanning direction is the first speed. On the other hand, when the moving speed of the scanned surface of the latent image carrier in the sub-scanning direction is the second speed, the light-emission controller enables the operation of each of the first light-emitting element and the third light-emitting element and disables the operation of the second light-emitting element.

Two of the first light-emitting element, the second light-emitting element, and the third light-emitting element may be provided in one first light source. The remaining one of the first light-emitting element, the second light-emitting element, and the third light-emitting element may then be provided in a second light source separate from the first light source.

In this case, one of the first light source and the second light source may be a P-wave light source. And the other of the first light source and the second light source may be an S-wave light source.

In addition, the first light source and the second light source may be provided adjacent to each other in a virtual plane along the main-scanning direction.

Furthermore, an optical system may be provided. The optical system leads a first light-source beam emitted from the first light source among the first, second and third light beams and a second light-source beam emitted from the second light source among the first, second and third light beams to the deflector. The optical system as above includes a characteristic plane and a guider. The characteristic plane has a characteristic planar surface. This characteristic planar surface has optical characteristics of transmitting one of the first light-source beam and the second light-source beam and reflecting the other of the first light-source beam and the second light source beam. The guider guides at least one of the first light-source beam and the second light source beam to the characteristic planar surface so that the first light-source beam and the second light-source beam are incident from sides opposite to each other to the characteristic planar surface of the characteristic plane and are emitted from the characteristic planar surface in the same direction as each other. The first light-source beam and the second light-source beam emitted from the characteristic planar surface of the characteristic plane are then led to the deflector.

Instead of such a configuration, the first light-emitting element, the second light-emitting element, and the third light-emitting element may be provided in separate light sources, respectively.

The aforementioned second speed may be ½ of the first speed. In this case, the second distance is set to ½ of the first distance.

Moreover, when the second speed is set to ½ of the first speed and the second distance is set to ½ of the first distance, the first light-emitting element, the second light-emitting element, and the third light-emitting element may be disposed as follows. That is, the first light-emitting element, the second light-emitting element, and the third light-emitting element may be disposed so that the scanning position of the third light beam on the scanned surface of the latent image carrier in the sub-scanning direction is an intermediate position between the scanning position of the first light beam and the scanning position of the second light beam on the scanned surface.

The image forming apparatus according to the second invention in the present invention includes the optical scanning device according to the first invention. Such image forming apparatuses include copiers, printers, and multi-functional printers (MFPs).

The optical scanning method according to the third invention in the present invention includes a deflection step and a light-emission control step. In the deflection step, each of the first light beam emitted from the first light-emitting element, the second light beam emitted from the second light-emitting element, and the third light beam emitted from the third light-emitting element is deflected so that the scanned surface of the latent image carrier is scanned in the main-scanning direction with each of the first light beam, the second light beam, and the third light beam, respectively. Moreover, in the light-emission control step, the operation of each of the first light-emitting element, the second light-emitting element, and the third light-emitting element is enabled or disabled individually. Here, a moving speed of the scanned surface of the latent image carrier in the sub-scanning direction is selectively controlled to be either one of a first speed and a second speed which is lower than the first speed. And the first light-emitting element and the second light-emitting element are disposed such that a mutual distance in the sub-scanning direction between a scanning position of the first light beam and the scanning position of the second light beam on the scanned surface of the latent image carrier is a first distance corresponding to the first speed. In addition, the third light-emitting element is disposed such that the mutual distance in the sub-scanning direction between the scanning position of the first light beam and the scanning position of the third light beam on the scanned surface of the latent image carrier is a second distance corresponding to the second speed. Moreover, in the light-emission control step, when the moving speed of the scanned surface of the latent image carrier in the sub-scanning direction is the first speed, the operation of each of the first light-emitting element and the second light-emitting element is enabled, and the operation of the third light-emitting element is disabled. On the other hand, when the moving speed of the scanned surface of the latent image carrier in the sub-scanning direction is the second speed, in the light-emission control step, the operation of each of the first light-emitting element and the third light-emitting element is enabled, and the operation of the second light-emitting element is disabled.

According to the present invention, the resolution in the sub-scanning direction can be switched, and the degree of lowering of the exposure processing speed due to the increase in the resolution can be suppressed, and this can be realized with a relatively simple and inexpensive configuration.

BRIEF DESCRIPTION OF THE DRAWINGS

FIG. 5 is a view schematically illustrating the configuration of a part of the optical scanning device in the first embodiment and an irradiation state of each laser beam to a photosensitive surface of the photosensitive drum.

FIG. 14 is a view schematically illustrating a configuration of a part of an optical scanning device in a third embodiment of the present invention and an irradiation state of each laser beam to the photosensitive surface of the photosensitive drum.

DESCRIPTION OF THE PREFERRED EMBODIMENTS

First Embodiment

Figure 1:
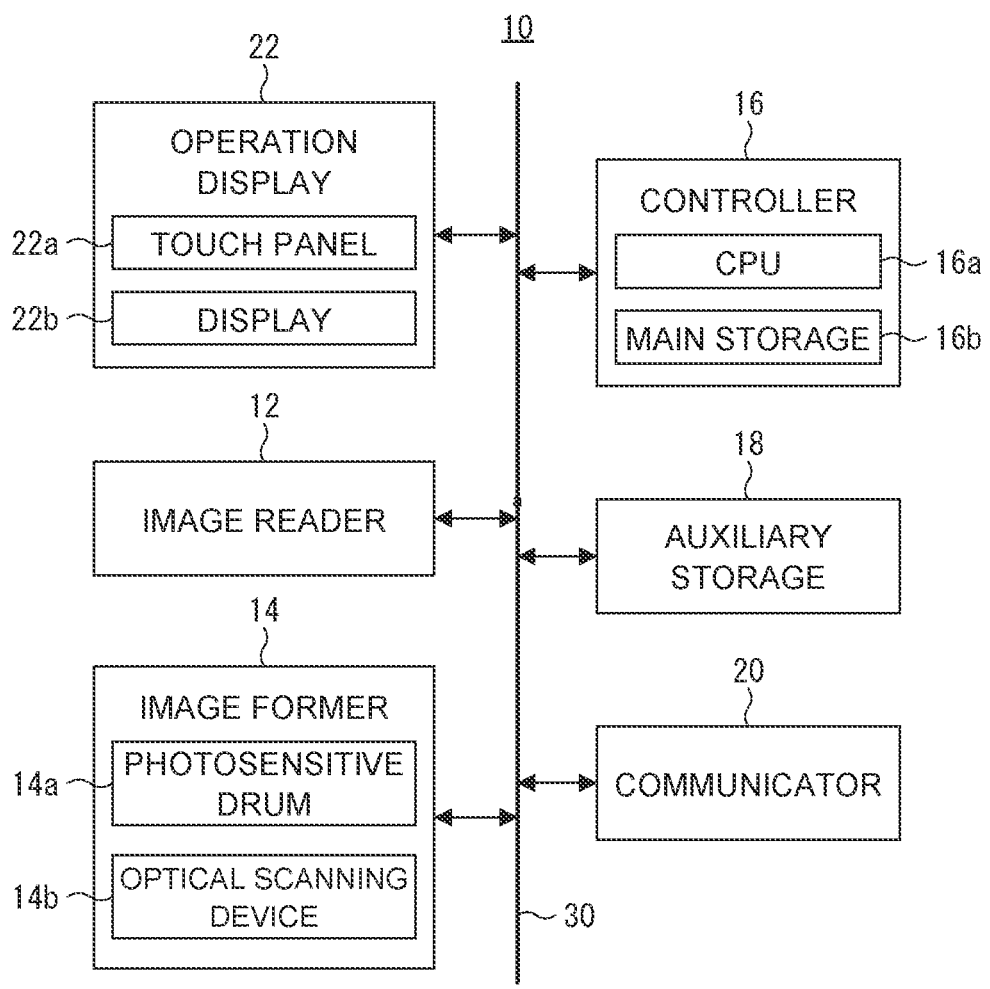
FIG. 1 is a block diagram illustrating an electrical configuration of a multifunctional printer according to a first embodiment of the present invention.

A first embodiment of the present invention will be described by taking a multifunctional printer 10 shown in FIG. 1 as an example.

The multifunctional printer 10 according to the first embodiment has a plurality of functions, such as a copying function, a printing function, an image scanning function, and a faxing function. Thus, the multifunctional printer 10 includes an image reader 12, an image former 14, a controller 16, an auxiliary storage 18, a communicator 20, and an operation display 22. They are connected to one another through a common bus 30.

The image reader 12 is an example of an image reader. That is, the image reader 12 is responsible for image reading processing of reading an image of a document, not shown, and outputting two-dimensional read image data corresponding to the image of the document. The image reader 12 includes a document table, not shown, on which a document, not shown, is placed. The document table is formed of a transparent hard member such as glass in a substantially rectangular flat-plate shape. An image reading unit including a light source, not shown, a mirror, a lens, a line sensor, and the like, and a drive mechanism, not shown, that moves an image reading position by the image reading unit are provided below this document table. And a document holder cover, not shown, that holds the document placed on the document table is provided above the document table. Note that an automatic document feeder (ADF), not shown, which is one of optional devices may be provided in the document holder cover.

The image former 14 is an example of an image former. That is, the image former 14 is responsible for image forming processing in which an image based on appropriate image data, such as read image data output from the image reader 12, formed on a sheet-like image recording medium, such as paper, not shown. This image forming processing is executed by a known electrophotographic method. Thus, the image former 14 includes a substantially cylindrical photosensitive drum 14a as an example of a latent image carrier. In addition, the image former 14 includes an exposing device as an exposer or includes an optical scanning device 14b in detail. Moreover, the image former 14 includes a charging device as a charger, not shown, a developing device as a developer, a transferring device as a transferer, a fixing device as a fixer, a cleaning device as a cleaner, a static eliminating device as a static eliminator, and the like. The image recording medium or a printed matter, so to speak, after the image is formed through the image forming processing by the image former 14 is discharged to a paper ejection tray, not shown. In FIG. 1, although the photosensitive drum 14a and the optical scanning device 14b are described one each for convenience of explanation including illustration, these (for the optical scanning device 14b, the exposing device including the optical scanning device 14b) are actually provided four each corresponding to four color components of CMYK color model, for example, in order to realize color image forming processing. The charging device, the developing device, the transferring device, the fixing device, the cleaning device, the static eliminating device and the like are also provided in four each.

The controller 16 is an example of a controller which is responsible for overall control of the multifunctional printer 10. For this purpose, the controller 16 has a computer, such as a CPU 16a, as a control executor. In addition, the controller 16 has a main storage 16b as a main memory storage directly accessible by the CPU 16a. The main storage 16b includes, for example, a ROM and a RAM, not shown. In the ROM among them, a control program for controlling operations of the CPU 16a, so-called firmware, is stored. The RAM constitutes a work area and a buffer area that are used when the CPU 16a executes processing based on the control programs.

An auxiliary storage 18 is an example of an auxiliary storage. In this auxiliary storage 18, various types of data including various types of image data such as the aforementioned read image data are stored as appropriate. The auxiliary storage 18 as above has, for example, a hard disk drive, not shown. In addition, the auxiliary storage 18 may have a rewritable non-volatile semiconductor memory such as a flash memory.

The communicator 20 is an example of a communicator. This communicator 20 is connected to a communication network, not shown, and thereby is responsible for bidirectional communication via the communication network. The communication network herein includes LAN, the Internet, a public switched telephone network and the like. Moreover, the LAN includes a wireless LAN, in particular, Wi-Fi®.

The operation display 22 is a so-called operation panel, and has a touch panel 22a as an example of an operation acceptor and a display 22b as an example of a display, that is, the display 22b with the touch panel 22a. That is, the touch panel 22a is a substantially transparent rectangular sheet-like member, and the display 22b has a roughly rectangular display surface. The touch panel 22a is provided so that it overlaps a display surface of the display 22b, thereby constituting the display 22b with the touch panel 22a. The touch panel 22a is, for example, an electrostatic capacitance-type panel, but it is not limited thereto and may be a panel of other methods such as an electromagnetic induction method, a resistive film method, or an infrared method. Note that the display 22b is a liquid crystal display (LCD), for example, but it is not limited thereto and may be a display employing another method such as an organic electroluminescent (EL) display. Moreover, the operation display 22 includes, in addition to the touch panel 22a, an appropriate hardware switch such as a push button switch, not shown. Additionally, the operation display 22 has, in addition to the display 22b, an appropriate light emitter, such as a light-emitting diode (LED), not shown.

Now, according to the multifunctional printer 10 according to the first embodiment in particular, according to the image former 14, the image forming processing is executed by the electrophotographic method as described above. That is, electrostatic charges are imparted to the photosensitive surface, which is the surface of the photosensitive drum 14a, by the charging processing by the charging device. Then, the exposure processing by the exposing device including the optical scanning device 14b is executed to form a latent image, which is a two-dimensional electrostatic image based on the image data provided for the image forming processing, on the photosensitive surface of the photosensitive drum 14a. Moreover, toner adheres to the latent image on the photosensitive surface of the photosensitive drum 14a, whereby a toner image is formed by the developing processing by the developing device. Then, the toner image on the photosensitive surface of the photosensitive drum 14a is transferred to the image recording medium by the transferring processing by the transferring device. The toner image is fixed to the image recording medium by further executing the fixing processing to the image recording medium to which this toner image was transferred by the fixing device. As a result, an image is formed on the image recording medium. Thereafter, the toner remaining on the photosensitive surface of the photosensitive drum 14a is removed by a cleaning processing by the cleaning device. Then, static electricity remaining on the photosensitive surface of the photosensitive drum 14a is removed by static elimination processing by the static eliminating device.

Figure 2:
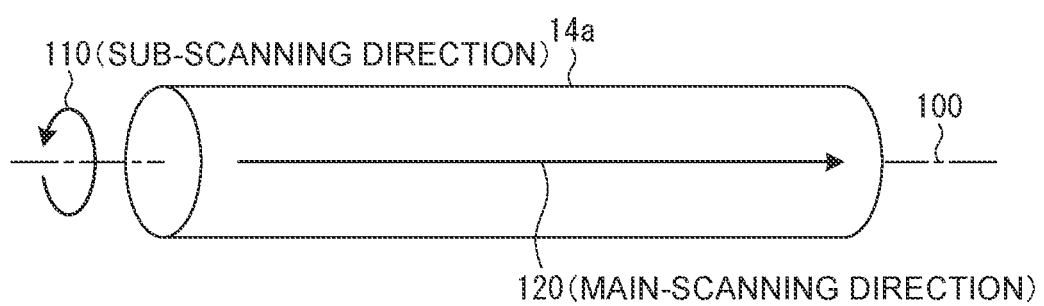
FIG. 2 is a diagram schematically illustrating a photosensitive drum in the first embodiment.

Here, as shown in FIG. 2, the photosensitive drum 14a rotates with a straight line 100 passing through a center thereof as its axis, for example, in the direction indicated by an arrow 110. In the exposure processing by the exposing device including the optical scanning device 14b, three laser beams B1, B2 and CB are emitted to an exposure surface of the photosensitive drum 14a as described below, or strictly speaking, two of the three laser beams B1, B2 and CB are selectively emitted. In addition, the irradiation positions (laser spots) of the respective laser beams B1, B2, and CB on the exposure surface of the photosensitive drum 14a are moved, that is, scanned, at a certain speed in a direction along the rotation axis 100 of the photosensitive drum 14a in the direction indicated by the arrow 120, for example. As the photosensitive drum 14a rotates, the irradiation positions of the respective laser beams B1, B2, and CB on the exposure surface of the photosensitive drum 14a are also moved, that is, scanned, in the rotational direction 110 of the photosensitive drum 14a. This direction 120 along the rotation axis 100 of the photosensitive drum 14a is defined as a main-scanning direction. And the rotational direction 110 of the photosensitive drum 14a is defined as a sub-scanning direction. Moreover, in the first embodiment, the rotation axis 100 of the photosensitive drum 14a extends along a horizontal direction, for example, that is, the photosensitive drum 14a is provided so as to be so.

Figure 3:
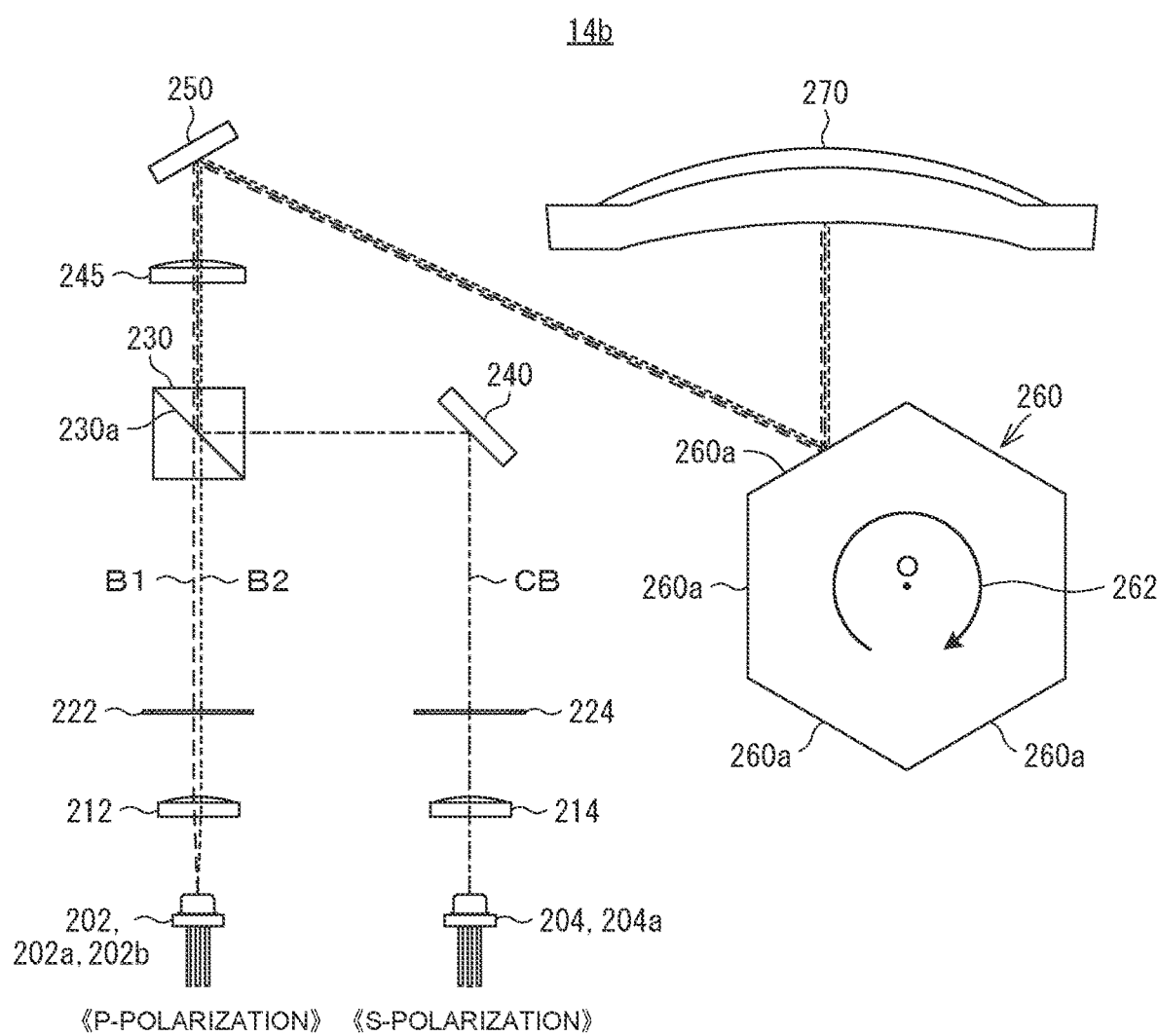
FIG. 3 is a view of a configuration of a part of an optical scanning device in the first embodiment when seen from above.
Figure 4:
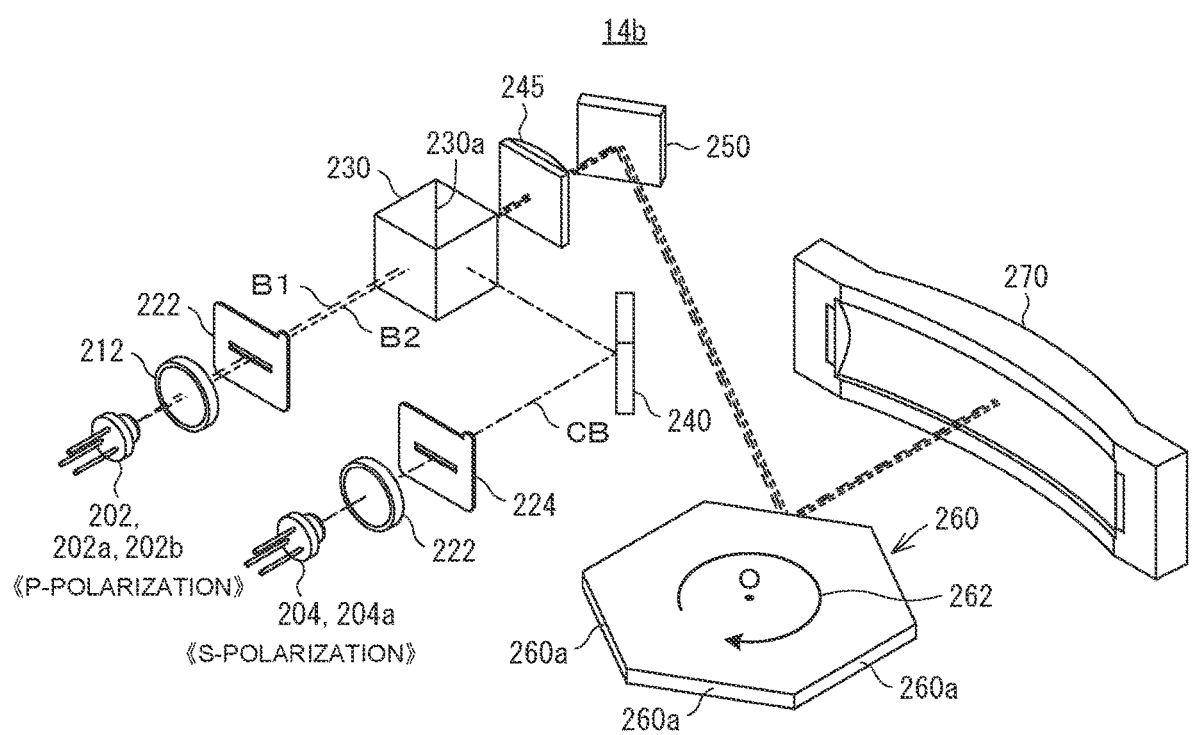
FIG. 4 is a view of the configuration of a part of the optical scanning device in the first embodiment when seen from diagonally above.

The optical scanning device 14b can switch the resolution of the latent image in the sub-scanning direction and can switch the resolution to two resolutions, that is, normal resolution of 600 dpi and high resolution of 1200 dpi, for example. And in particular, in order to suppress the degree of lowering of the exposure processing speed when the resolution in the sub-scanning direction is 1200 dpi, the optical scanning device 14b has two laser diodes 202 and 204 as two light sources, as shown in FIGS. 3 and 4.

One of the laser diodes or the first laser diode 202 so to speak, is a 2-beam type laser diode having two light-emitting elements (oscillating elements), that is, the first light-emitting element and the second light-emitting element as described below (see FIG. 5). That is, the first laser diode 202 is capable of emitting a first laser beam B1 from the first light-emitting element 202a and a second laser beam B2 from the second light-emitting element 202b, that is, of emitting the two laser beams B1 and B2. The first laser diode 202 is a P-wave light source, for example. Hence, the first laser beam B1 and the second laser beam B2 are both P-wave (polarized) laser beams.

On the other hand, the other laser diode or the second laser diode 204 so to speak is a 1-beam type laser diode having only one light-emitting element 204a, as described below (see FIG. 5). This second laser diode 204 is an S-wave light source, for example. That is, the third laser beam CB emitted from the so-called third light-emitting element 204a of the second laser diode 204 is an S-wave (polarized) laser beam.

These first laser diodes 202 and second laser diodes 204, that is, the first light-emitting element 202a, the second light-emitting element 202b, and the third light-emitting element 204a are driven by a laser drive circuit, not shown. The laser drive circuit drives the first light-emitting element 202a, the second light-emitting element 202b, and the third light-emitting element 204a individually on the basis of the image data provided for the image forming processing.

Specifically, when the resolution in the sub-scanning direction is 600 dpi, that is, when the setting is as such, for example, the laser drive circuit handles only the first light-emitting element 202a and the second light-emitting element 202b as driving targets and enables the operation of each of the first light-emitting element 202a and the second light-emitting element 202b, so to speak. Then, the laser drive circuit does not handle the third light-emitting element 204a as a driving target, that is, disables the operation of the third light-emitting element 204a. The laser drive circuit then drives the first light-emitting element 202a on the basis of the data on odd-numbered lines (rows) included in the image data, and drives the second light-emitting element 202b on the basis of the data on even-numbered lines included in the image data, for example. As a result, the first laser beam B1 is emitted from the first light-emitting element 202a in a manner based on the data of the odd-numbered lines of the image data, and the second laser beam B2 is emitted from the second light-emitting element 202b in a manner based on the data of the even-numbered lines of the image data. These first laser beams B1 and second laser beams B2 are emitted in the horizontal direction, that is, the first laser diode 202 is provided so that they do so. Note that the third laser beam CB is not emitted from the third light-emitting element 204a.

On the other hand, when the resolution in the sub-scanning direction is 1200 dpi, the laser drive circuit handles only the first light-emitting element 202a and the third light-emitting element 204a as driving targets, that is, enables the operation of each of the first light-emitting element 202a and the third light-emitting element 204a. Then, the laser drive circuit does not handle the second light-emitting element 202b as a driving target, that is, disables the operation of the second light-emitting element 202b. The laser drive circuit then drives the first light-emitting element 202a on the basis of the data on odd-numbered lines included in the image data, and drives the third light-emitting element 204a on the basis of the data on even-numbered lines included in the image data, for example. As a result, the first laser beam B1 is emitted from the first light-emitting element 202a in a manner based on the data of the odd-numbered lines of the image data, and the third laser beam CB is emitted from the third light-emitting element 204a in a manner based on the data of the even-numbered lines of the image data. Note that the third laser beam CB is also emitted in the horizontal direction, that is, the second laser diode 204 is provided so that it does so. Then, the second laser beam B2 is not emitted from the second light-emitting element 202b.

The first laser beam B1 and the second laser beam B2 emitted from the first laser diode 202 (the first light-emitting element 202a and the second light-emitting element 202b) are corrected into parallel light (collimated light) by a collimating lens 212, and then are incident into a cube-type polarizing beam splitter (polarizing prism) 230 through an aperture 222, and in detail are incident on a boundary surface (separation surface) 230a in the polarizing beam splitter 230. In more detail, the boundary surface 230a forms a right angle with respect to the horizontal direction, and the polarizing beam splitter 230 is provided so that the first laser beam B1 and the second laser beam B2 are incident at an angle of 45 degrees with respect to the boundary surface 230a, that is, so that they do so.

On the other hand, the third laser beam CB emitted from the second laser diode 204 (third light-emitting element 204a) is corrected to be collimated by a collimating lens 214, which is different from the above, and then is incident to a planar mirror 240 through an aperture 224, which is different from the above. Then, the third laser beam CB incident to the planar mirror 240 is reflected by the planar mirror 240 and then is incident to the boundary surface 230a of the polarizing beam splitter 230. In more detail, the planar mirror 240 is provided so that the third laser beam CB reflected by the planar mirror 240 travels along the horizontal direction, that is, so that it does so. Then, the third laser beam CB reflected by the planar mirror 240 is incident to the boundary surface 230a of the polarizing beam splitter 230 from a side opposite to the side on which the first laser beam B1 (and the second laser beam B2) is incident and at a right angle to the incident direction of the first laser beam B1, that is, at an angle conjugate to the incident angle of the first laser beam B1.

The boundary surface 230a of the polarizing beam splitter 230 has optical characteristics of transmitting the first laser beam B1 and the second laser beam B2 of the P wave, while reflecting the third laser beam CB of the S wave. Accordingly, the first laser beam B1 and the second laser beam B2 incident to the boundary surface 230a are transmitted through the boundary surface 230a. On the other hand, the third laser beam CB incident to the boundary surface 230a is reflected by the boundary surface 230a, and then is emitted and travels in the same direction as the first laser beam B1 (and the second laser beam B2). That is, the polarizing beam splitter 230 functions as a synthesizer that synthesizes the first laser beam B1 and the third laser beam CB when the resolution in the sub-scanning direction is 1200 dpi.

The first laser beam B1 and the second laser beam B2 transmitted through the boundary surface 230a of the polarizing beam splitter 230 and the third laser beam CB reflected by the boundary surface 230a are incident to a planar mirror 250 different from the above through a cylindrical lens 245. The first laser beam B1, the second laser beam B2, and the third laser beam CB incident to the planar mirror 250 are reflected by the planar mirror 250 and then are incident to a polygon mirror 260 as an example of the deflector, or strictly speaking, are incident to a reflecting surface 260a of the polygon mirror 260. Note that the first laser beam B1, the second laser beam B2, and the third laser beam CB reflected by the planar mirror 250 also travel along the horizontal direction, that is, the planar mirror 250 is provided so that they do so.

The polygon mirror 260 is a hexahedral mirror having six reflecting surfaces 260a, 260a, . . . and rotates around a straight line, not shown, passing through its center O, for example, in the direction indicated by an arrow 262, for example. The rotation axis of the polygon mirror 260 extends along a vertical direction, that is, the polygon mirror 260 is provided so as to do so. Accordingly, the first laser beam B1, the second laser beam B2, and the third laser beam CB reflected by the aforementioned planar mirror 250 are sequentially incident to the respective reflecting surfaces 260a, 260a, . . . of the polygon mirror 260 and are sequentially reflected by the respective reflecting surfaces 260a, 260a, . . . thereof. Then, the reflection directions of the first laser beam B1, the second laser beam B2, and the third laser beam CB by the respective reflecting surfaces 260a are continuously changed along the horizontal direction, so to speak, deflected.

The first laser beam B1, the second laser beam B2, and the third laser beam CB reflected by the respective reflecting surfaces 260a of the polygon mirrors 260 are emitted to the exposure surface of the photosensitive drum 14a through a fθ lens 270. The first laser beam B1, the second laser beam B2, and the third laser beam CB emitted to the exposure surface of the photosensitive drum 14a are deflected as described above, so that the respective irradiation positions of the first laser beam B1, the second laser beam B2, and the third laser beam CB on the exposure surface of the photosensitive drum 14a are moved in the direction 120 along the rotation axis 100 of the photosensitive drum 14a, that is, scanning is performed in the main scanning direction. In addition, as the photosensitive drum 14a rotates as described above, the respective irradiation positions of the first laser beam B1, the second laser beam B2, and the third laser beam CB on the exposure surface of the photosensitive drum 14a are moved, that is, scanning is also performed in the rotational direction 110 of the photosensitive drum 14a, that is, in the sub-scanning direction.

FIG. 5, or the central figure in FIG. 5 in particular, schematically illustrates the configuration of a part in FIG. 3. And the figure enclosed by a two-dot chained rectangular frame α at lower left in FIG. 5 is a view of the first light-emitting element 202a and the second light-emitting element 202b of the first laser diode 202, or strictly speaking, each emission point of the first light-emitting element 202a and the second light-emitting element 202b seen from a direction opposite to a direction in which the first laser beam B1 and the second laser beam B2 are emitted (lower side in the central figure of FIG. 5).

As can be seen from the figure surrounded by this rectangular frame α, the first light-emitting element 202a and the second light-emitting element 202b are disposed not to be aligned in a vertical direction corresponding to the sub-scanning direction, for example, but to be aligned diagonally, that is, the first laser diode 202 is provided so as to be so. This is because, while the mutual distance between the first light-emitting element 202a and the second light-emitting element 202b (the shortest distance between the centers of each other) is determined by specifications of components employed as the first laser diode 202, a mutual distance Da in the sub-scanning direction between the irradiation position (scanning position) of the first laser beam B1 to the photosensitive surface of the photosensitive drum 14a and the irradiation position of the second laser beam B2 to the photosensitive surface needs to be a predetermined distance, as described below. Note that the first laser diode 202 is of a so-called CAN package type having a substantially cylindrical enclosure, and the first light-emitting element 202a and the second light-emitting element 202b are disposed symmetrically with respect to the center of the enclosure.

The figure enclosed by a two-dot chained rectangular frame β at lower right in FIG. 5 is a view of the third light-emitting element 204a of the second laser diode 204 or strictly speaking, a light-emitting point of the third light-emitting element 204a, seen from the direction opposite to the direction in which the third laser beam CB is emitted (lower side in the central figure of FIG. 5). Note that the second laser diode 204 is also of the CAN package type, and the third light-emitting element 204a is disposed at the center of the enclosure of the second laser diode 204.

Moreover, the figure enclosed by a two-dotted chained rectangular frame γ at the top in FIG. 5 schematically illustrates irradiation states of the first laser beam B1, the second laser beam B2, and the third laser beam CB, respectively, to the photosensitive surface (scanned surface) of the photosensitive drum 14a. The left-right direction in the figure surrounded by this rectangular frame γ corresponds to the main-scanning direction, and the up-down direction in the figure surrounded by this rectangular frame γ corresponds to the sub-scanning direction.

In the figure surrounded by this rectangular frame γ, when the resolution in the sub-scanning direction is 600 dpi, for example, by paying attention to each of the irradiation positions of the first laser beam B1 and the second laser beam B2 provided for the exposure processing, the irradiation positions are aligned in a diagonal direction similarly to the disposition of the first light-emitting element 202a and the second light-emitting element 202b, which are output sources of them. Then, in the sub-scanning direction, each of the irradiation positions of the first laser beam B1 and the second laser beam B2 has a distance of Da between them. This distance Da is a value corresponding to the resolution in the sub-scanning direction of 600 dpi, that is, approximately 42.3 µm (=25.4 mm/600). In order to have the mutual distance Da between each of irradiation positions of the first laser beam B1 and the second laser beam B2 in the sub-scanning direction to be a predetermined distance of approximately 42.3 µm, the first light-emitting element 202a and the second light-emitting element 202b are disposed to be aligned in the diagonal direction as described above.

Note that a mutual relationship between each of the irradiation positions of the first laser beam B1 and the second laser beam B2 is opposite to the relationship of the disposition of the first light-emitting element 202a and the second light-emitting element 202b. That is, in the figure surrounded by the rectangular frame α, the first light-emitting element 202a is disposed at lower left of the second light-emitting element 202b, while in the figure surrounded by the rectangular frame γ, the irradiation position of the first laser beam B1 is at upper right of the irradiation position of the second laser beam B2. This is because optical paths of the first laser beam B1 and the second laser beam B2 are switched between an incident side and an output side of the collimating lens 212 interposed in the optical paths of the first laser beam B1 and the second laser beam B2.

On the other hand, by paying attention to each of the irradiation positions of the first laser beam B1 and the third laser beam CB provided for the exposure processing when the resolution in the sub-scanning direction is 1200 dpi, or the irradiation position of the third laser beam CB in particular, the irradiation position of the third laser beam CB is at an intermediate position in a line between the irradiation position of the first laser beam B1 and the irradiation position of the second laser beam B2. That is, the irradiation position of the third laser beam CB is at the intermediate position between the irradiation position of the first laser beam B1 and the irradiation position of the second laser beam B2 both in the main-scanning direction and the sub-scanning direction.

In other words, the second laser diode 204 having the third light-emitting element 204a, which is an output source of the third laser beam CB, is provided so as to do so.

Therefore, a mutual distance Db in the sub-scanning direction between each of the irradiation positions of the first laser beam B1 and the third laser beam CB is ½ of the mutual distance Da in the sub-scanning direction of each of the irradiation positions of the first laser beam B1 and the second laser beam B2, that is, approximately 21.2 µm (=Da/2). This mutual distance Db of approximately 21.2 µm is a value corresponding to the resolution in the sub-scanning direction of 1200 dpi (=25.4 mm/1200).

According to the optical scanning device 14b having such a configuration, when the resolution in the sub-scanning direction is 600 dpi, for example, the first laser beam B1 and the second laser beam B2 are provided for the exposure processing as described above. Then, the first laser beam B1 and the second laser beam B2 perform scanning once in the main-scanning direction by one of the reflecting surfaces 260a of the polygon mirror 260 to form a latent image for two lines. In addition, each time the first laser beam B1 and the second laser beam B2 perform scanning once in the main-scanning direction, the photosensitive surface of the photosensitive drum 14a moves in the sub-scanning direction for two lines, that is, approximately 84.7 µm (=approximately 42.3 µm×2). In other words, the photosensitive drum 14a rotates at such a speed. By repeating this process, a latent image with a resolution of 600 dpi in the sub-scanning direction is formed. Since the respective irradiation positions of the first laser beam B1 and the second laser beam B2 are aligned in the diagonal direction as described above, the respective irradiation positions of the first laser beam B1 and the second laser beam B2 are displaced in the main scanning direction. An influence of this displacement is compensated for by drive timing of the first light-emitting element 202a and the second light-emitting element 202b, respectively.

On the other hand, when the resolution in the sub-scanning direction is 1200 dpi, the first laser beam B1 and the third laser beam CB are provided for the exposure processing. Then, the first laser beam B1 and the third laser beam CB perform scanning once in the main-scanning direction by one of the reflecting surfaces 260a of the polygon mirror 260 to form a latent image for two lines. In addition, each time the first laser beam B1 and the third laser beam CB perform scanning once in the main-scanning direction, the photosensitive surface of the photosensitive drum 14a moves in the sub-scanning direction for two lines, that is, approximately 42.3 µm (=approximately 21.2 µm×2). In other words, the photosensitive drum 14a rotates at such a speed. By repeating this process, a latent image with a resolution of 1200 dpi in the sub-scanning direction is formed. That is, when the resolution in the sub-scanning direction is 1200 dpi, the scanning speed in the sub-scanning direction is lowered to ½ as compared with a case where the resolution in the sub-scanning direction is 600 dpi. In other words, the rotational speed of the photosensitive drum 14*a* when the resolution in the sub-scanning direction is 1200 dpi is ½ of the rotational speed of the photosensitive drum 14*a* when the resolution in the sub-scanning direction is 600 dpi.

The respective irradiation positions of the first laser beam B1 and the third laser beam CB are also aligned in the diagonal direction, that is, the respective irradiation positions of the first laser beam B1 and the third laser beam CB are displaced in the main-scanning direction. An influence of this displacement is compensated for by the drive timing of the first light-emitting element 202*a* and the third light-emitting element 204*a*, respectively.

The resolution in the main-scanning direction is constant and is 600 dpi, for example, regardless of the resolution in the sub-scanning direction. In other words, the rotational speed of the polygon mirror 260, that is, the scanning speed in the main-scanning direction, is constant, regardless of the resolution in the sub-scanning direction.

Figure 6:
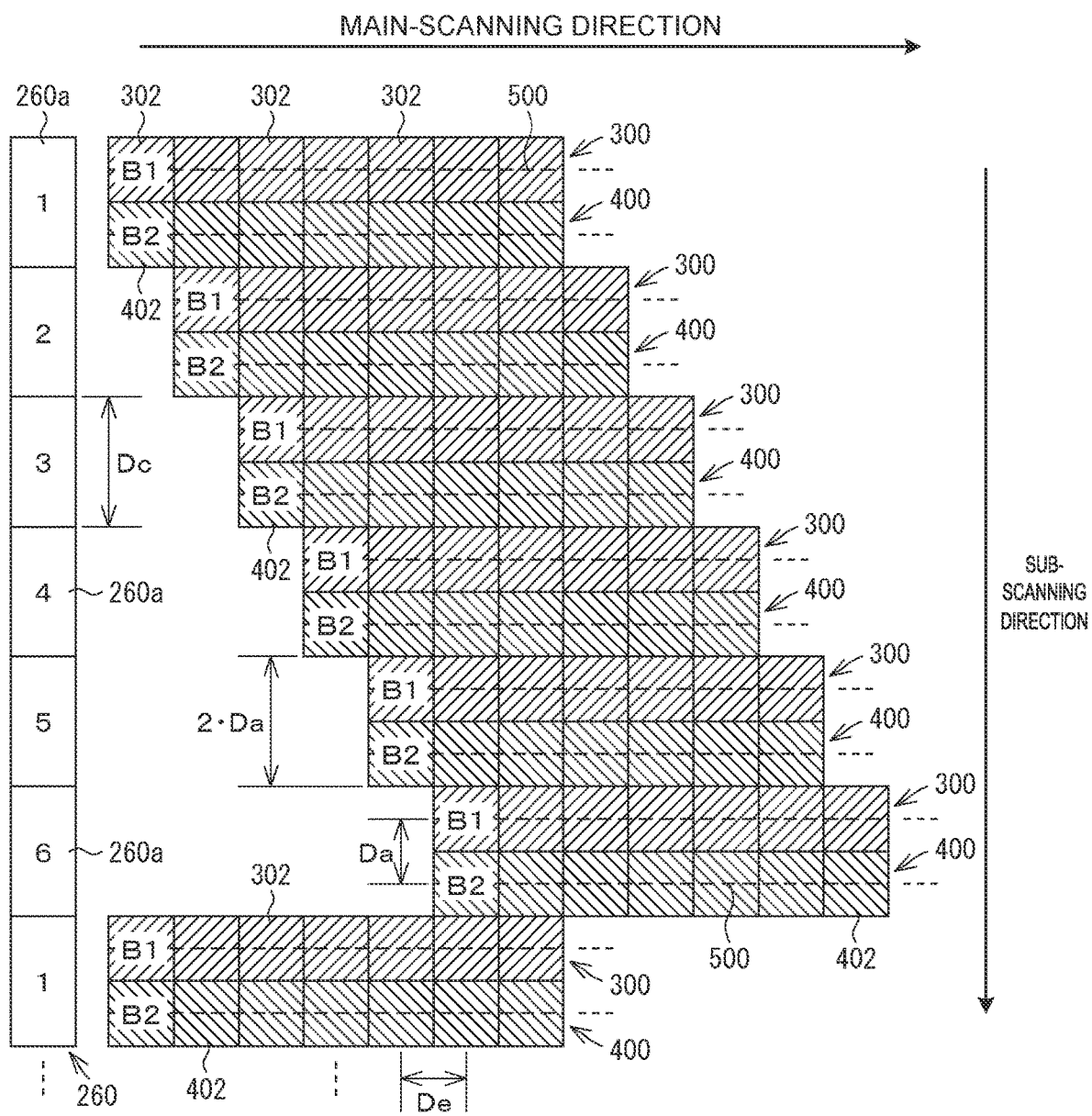
FIG. 6 is a diagram for explaining an optical scanning procedure when resolution in a sub-scanning direction in the first embodiment is normal resolution.

The procedure of the exposure processing by the exposing device including the optical scanning device 14*b* as above, or the procedure of the exposure when the resolution in the sub-scanning direction is normal resolution of 600 dpi in particular, is illustrated in the figure as shown in FIG. 6. This FIG. 6 conceptually illustrates how the respective reflecting surfaces 260*a*, 260*a*, . . . of the polygon mirror 260 and the first laser beam B1 and the second laser beam B2 reflected by the respective reflecting surfaces 260*a* relate to the exposure processing, involving the main-scanning direction and the sub-scanning direction. Note that the numerical values from "1" to "6" attached to each of the reflecting surfaces 260*a*, 260*a*, . . . of the polygon mirror 260 in FIG. 6 represent the numbers of the respective reflecting surfaces 260*a*, 260*a*, . . . concerned.

As shown in this FIG. 6, the first laser beam B1 and the second laser beam B2 reflected by one reflecting surface 260*a* of the polygon mirror 260 perform scanning once in the main-scanning direction, whereby main-scanning lines 300 and 400 for two lines, that is, the latent images for two lines are formed. Each time the first laser beam B1 and the second laser beam B2 perform scanning once in the main-scanning direction, that is, each time the reflecting surface 260*a* which reflects the first laser beam B1 and the second laser beam B2 is switched, the positions of the main-scanning lines 300 and 400 move in the sub-scanning direction for two lines, or in detail by a pitch of approximately 84.7 μm (=2·Da). By repeating this process, a latent image with a resolution of 600 dpi in the sub-scanning direction is formed.

A dimension Dc in the sub-scanning direction of each of the respective reflecting surfaces 260*a* of the polygon mirror 260 corresponds to a repetition period of scanning in the main-scanning direction, that is, corresponds to time required for the polygon mirror 260 to rotate by 60 degrees (=360 degrees/6). As described above, since the rotational speed of the polygon mirror 260 is constant, the repetition period (Dc) of scanning in the main-scanning direction is also constant.

And each of a plurality of rectangular elements 302, 302, . . . constituting the main-scanning line 300 by the first laser beam B1 in FIG. 6 represents a latent image for one pixel, or strictly speaking, represents an irradiation position of the first laser beam B1 for forming the latent image for one pixel. This is also true for a plurality of rectangular elements 402, 402, . . . constituting the main-scanning line 400 by the second laser beam B2. An interval De in the main-scanning direction of these rectangular elements 302, 302, . . . (or 402, 402, . . . ) is a value corresponding to resolution in the main-scanning direction of 600 dpi, that is, approximately 42.3 μm.

Moreover, in FIG. 6, a broken line with a sign 500 represents a main-scanning line of the third laser beam CB, assuming that an operation of the third light-emitting element 204*a* is enabled. In addition, in FIG. 6, the positions of the main-scanning lines 300 and 400 in the main-scanning direction are displaced between each of the reflecting surfaces 260*a*, 260*a*, . . . , which is an intentional measure in consideration of ease of viewing FIG. 6.

Figure 7:
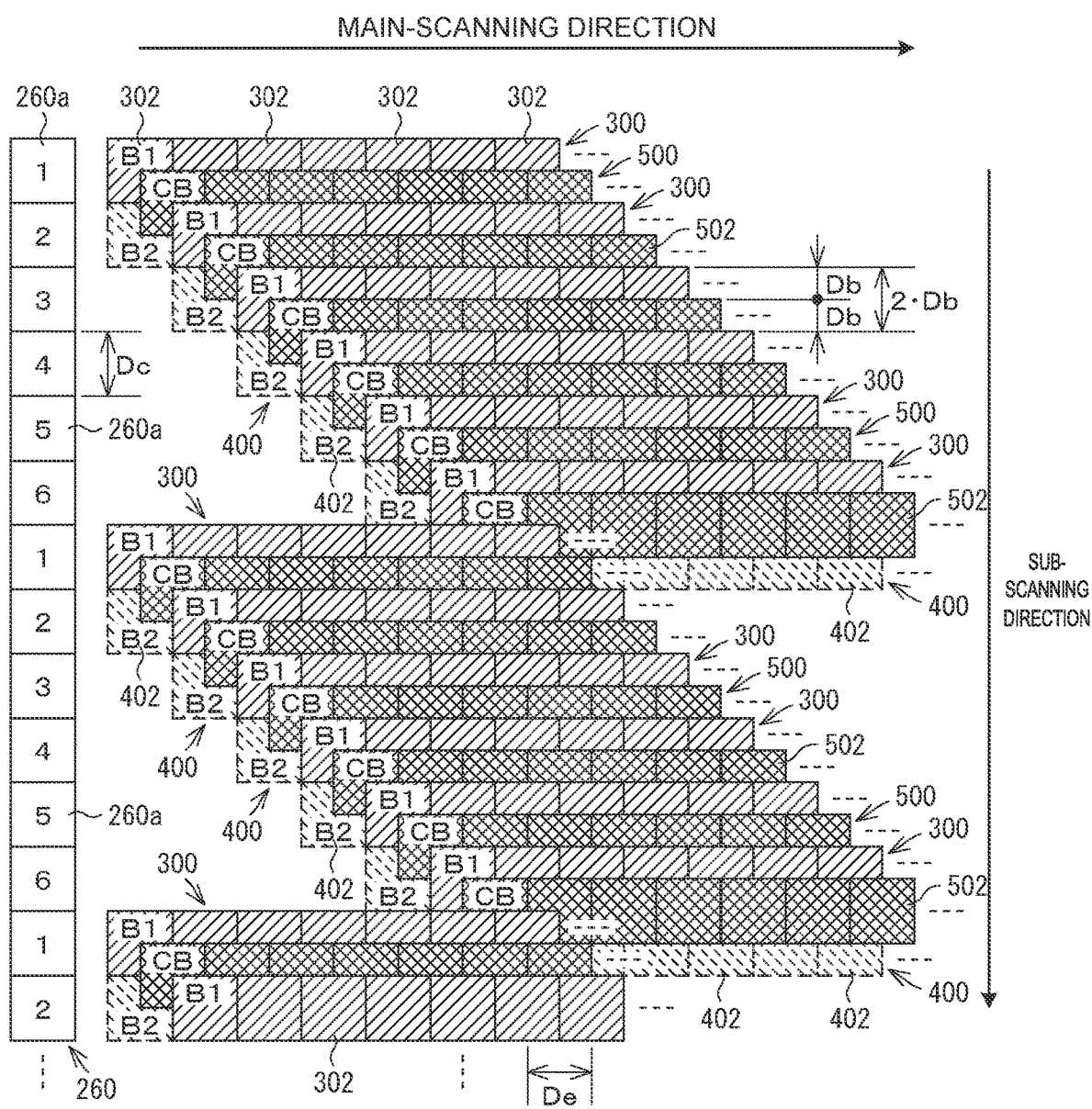
FIG. 7 is a diagram for explaining the optical scanning procedure when the resolution in the sub-scanning direction in the first embodiment is high resolution.

On the other hand, the exposure procedure when the resolution in the sub-scanning direction is as high as 1200 dpi, for example, is illustrated in the figure as shown in FIG. 7. As described above, when the resolution in the sub-scanning direction is 1200 dpi, the first laser beam B1 and the third laser beam CB are provided for the exposure processing. Then, the operation of the second light-emitting element 202*b*, which is an output source of the second laser beam B2, is disabled. Note that, in FIG. 7, the main-scanning line 400 of the second laser beam B2 in the case where the operation of the second light-emitting element 202*b* is assumed to be enabled is shown by a broken line.

As shown in this FIG. 7, when the resolution in the sub-scanning direction is 1200 dpi, the first laser beam B1 and the third laser beam CB, which are reflected by one reflecting surface 260*a* of the polygon mirror 260, perform scanning once in the main-scanning direction, whereby the main-scanning lines 300 and 500 for two lines are formed, that is, latent images for two lines are formed. Each time the first laser beam B1 and the third laser beam CB perform scanning once in the main-scanning direction, that is, each time the reflecting surface 260*a* that reflects the first laser beam B1 and the third laser beam CB is switched, the positions of the main-scanning lines 300 and 500 move in the sub-scanning direction for two lines, in detail by a pitch of approximately 42.3 μm (=2·Db). By repeating this process, a latent image with a resolution of 1200 dpi in the sub-scanning direction is formed.

Each of a plurality of rectangular elements 502, 502, . . . constituting the main-scanning line 500 by the third laser beam CB in FIG. 7 also represents a latent image for one pixel, or strictly speaking, represents an irradiation position of the third laser beam CB for forming the latent image for the one pixel. And also in FIG. 7, the positions of the main-scanning lines 300 and 500 in the main-scanning direction are intentionally shifted between each of the reflecting surfaces 260*a*, 260*a*, . . . in consideration of the ease of viewing.

In order to illustrate superiority of the optical scanning device 14*b* in the first embodiment, a first comparative example as below, for example, is assumed.

In other words, such a configuration is assumed in which only one 1-beam type laser diode is provided as a light source and the resolution in the sub-scanning direction is switched between two resolutions, that is, 600 dpi and 1200 dpi. Other than the above, as for the polygon mirror 260 in particular, the one similar to that in the first embodiment is employed.

Figure 8:
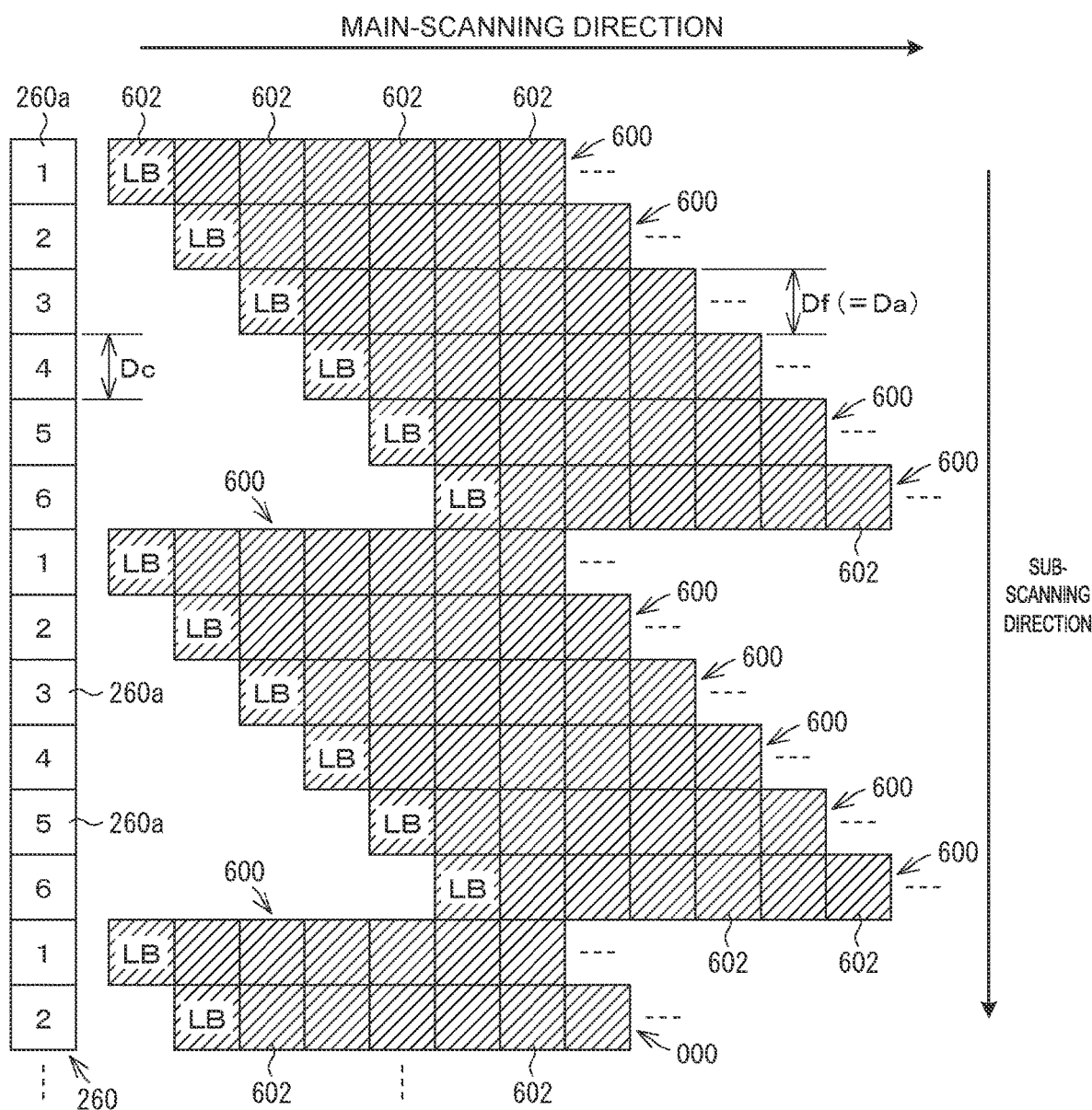
FIG. 8 is a diagram for explaining the optical scanning procedure when the resolution in the sub-scanning direction in a first comparative example, which is a comparison target of the first embodiment, is normal resolution.

In the first comparative example as above, the exposure procedure when the resolution in the sub-scanning direction is 600 dpi, for example, is illustrated in the figure as shown in FIG. 8. As shown in FIG. 8, in a configuration in which only one 1-beam type laser diode is provided as a light source, that is, in a configuration in which only one laser beam LB is emitted from the laser diode, only one main-scanning line 600 is formed by one session of scanning in the main-scanning direction by one reflecting surface 260*a* of the polygon mirror 260. Each time one session of scanning in the main-scanning direction is performed, that is, each time the reflecting surface 260*a* that reflects the laser beam LB is switched, the position of the main-scanning line 600 moves in the sub-scanning direction for one line, in detail at a pitch Df (=Da) of approximately 42.3 µm. Note that each of a plurality of rectangular elements 602, 602, . . . constituting the main-scanning line 600 in FIG. 8 represents an irradiation position of the laser beam LB for forming a latent image for one pixel.

On the other hand, according to the first embodiment, when the resolution in the sub-scanning direction is 600 dpi as described above (see FIG. 6), the main-scanning lines 300 and 400 for two lines are formed by one session of scanning in the main-scanning direction by one reflecting surface 260*a* of the polygon mirror 260. Then, each time one session of scanning in the main-scanning direction is performed, the positions of the main-scanning lines 300 and 400 move in the sub-scanning direction for two lines, in detail by a pitch (2·Da) of approximately 84.7 µm.

In short, according to the first embodiment, the scanning speed in the sub-scanning direction is doubled when the resolution in the sub-scanning direction is 600 dpi as compared with the first comparative example. Therefore, according to the first embodiment, the speed of the exposure processing when the resolution in the sub-scanning direction is 600 dpi can be doubled as compared with the first comparative example, and consequently the speed of the image forming processing including the exposure processing or the so-called processing speed can be doubled.

Figure 9:
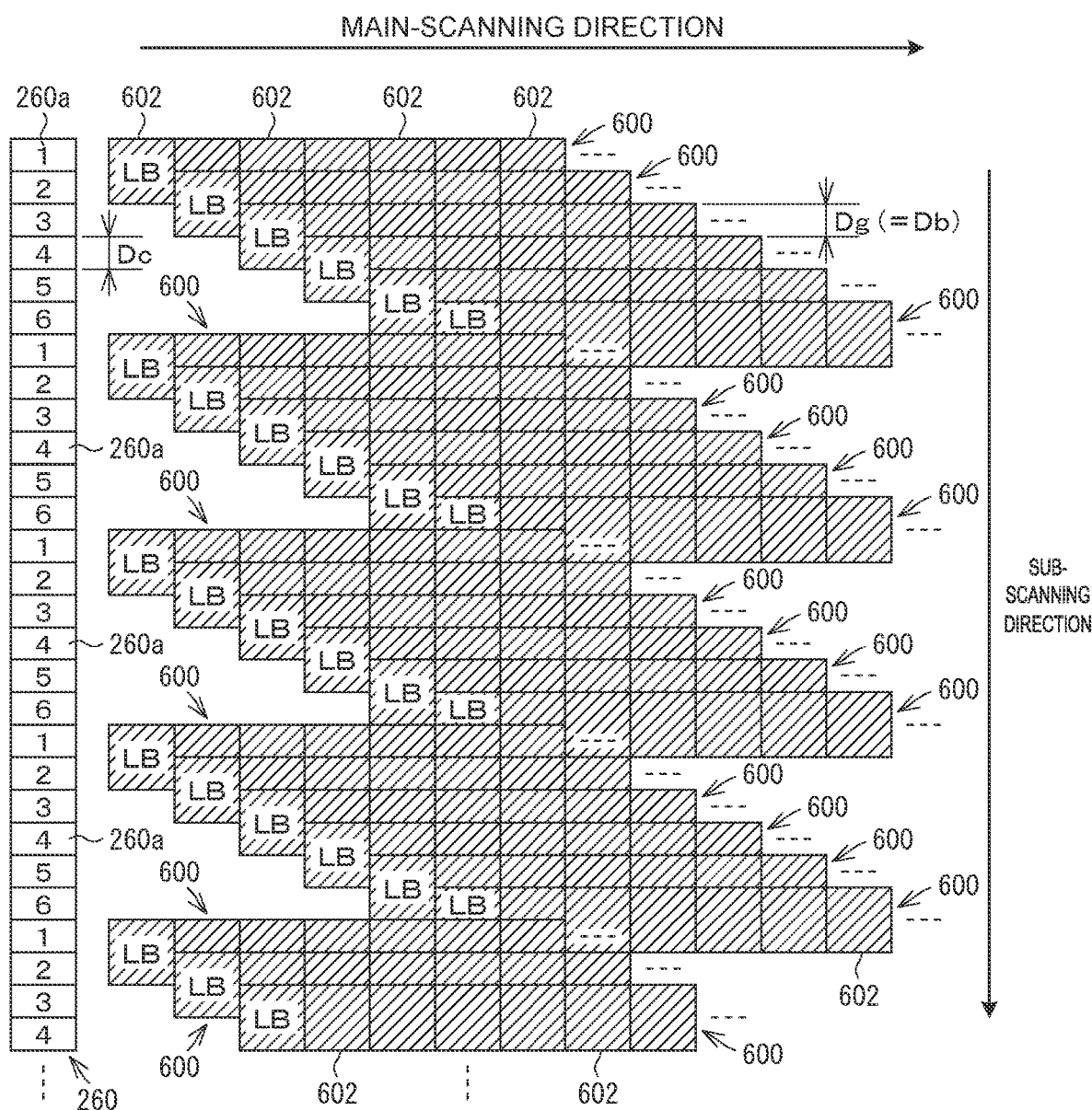
FIG. 9 is a diagram for explaining the optical scanning procedure when the resolution in the sub-scanning direction in the first comparative example is high resolution.

Moreover, in the first comparative example, the exposure procedure when the resolution in the sub-scanning direction is 1200 dpi is illustrated in the figure as shown in FIG. 9. As shown in this FIG. 9, even when the resolution in the sub-scanning direction is 1200 dpi, the main-scanning line 600 is formed only for one line by one session of scanning in the main-scanning direction by one reflecting surface 260*a* of the polygon mirror 260. Then, each time one session of scanning in the main-scanning direction is performed, the positions of the main-scanning line 600 moves in the sub-scanning direction for one line, in detail by a pitch Dg (=Db) of approximately 21.2 µm.

On the other hand, according to the present first embodiment, when the resolution in the sub-scanning direction is 1200 dpi as described above (see FIG. 7), the main-scanning lines 300 and 500 for two lines are formed by one session of scanning in the main-scanning direction by one reflecting surface 260*a* of the polygon mirror 260. Then, each time one session of scanning in the main-scanning direction is performed, the positions of the main-scanning lines 300 and 500 move in the sub-scanning direction for two lines, in detail by a pitch (2·Db) of approximately 42.3 µm.

In short, even when the resolution in the sub-scanning direction is 1200 dpi, the scanning speed in the sub-scanning direction is doubled according to the first embodiment as compared with the first comparative example. Therefore, according to the first embodiment, the exposure processing speed when the resolution in the sub-scanning direction is 1200 dpi can be increased by a factor of two compared with the first comparative example, and thus the processing speed can be increased by a factor of two.

Furthermore, as another comparison target of the first embodiment, a second comparative example as below is assumed, for example.

That is, such a configuration is assumed in which only one 2-beam type laser diode is provided as the light source and the resolution in the sub-scanning direction is switched between two resolutions, 600 dpi and 1200 dpi. Other than the above, as for the polygon mirror 260 in particular, the one similar to that in the first embodiment is employed.

Figure 10:
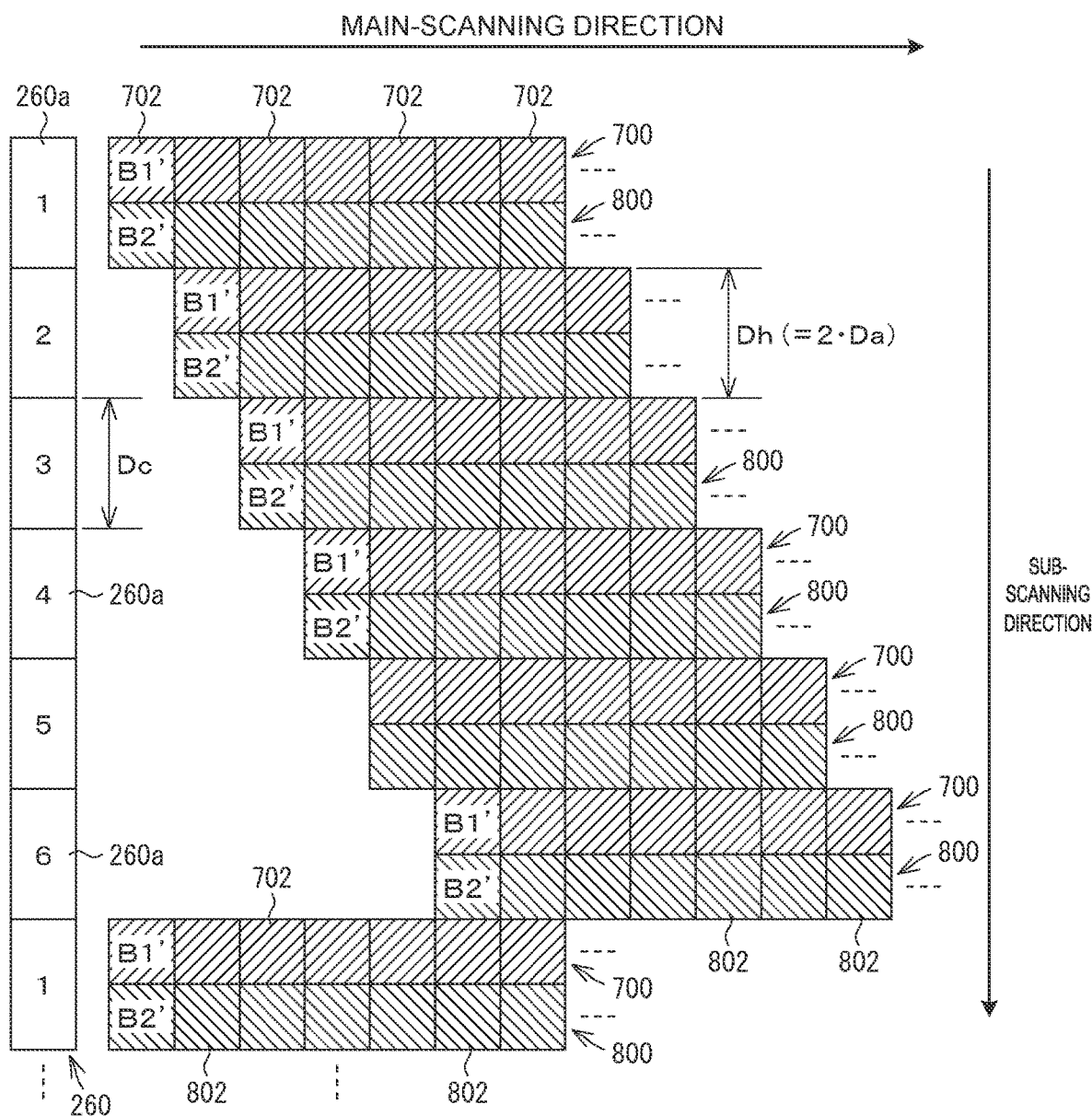
FIG. 10 is a diagram for explaining the optical scanning procedure when the resolution in the sub-scanning direction is normal resolution in a second comparative example, which is another comparison target of the first embodiment.

In this second comparative example, the exposure procedure when the resolution in the sub-scanning direction is 600 dpi, for example, is illustrated in the figure as shown in FIG. 10. As shown in this FIG. 10, in such a configuration in which only one 2-beam type laser diode is provided as a light source, that is, in a configuration in which two laser beams B1' and B2' are emitted from the laser diode, main-scanning lines 700 and 800 for two lines are formed by one session of scanning in the main-scanning direction by one reflecting surface 260*a* of the polygon mirror 260. Then, each time one session of scanning in the main-scanning direction is performed, that is, each time the reflecting surface 260*a* that reflects the two laser beams B1' and B2' is switched, the positions of the main-scanning lines 700 and 800 are moved in the sub-scanning direction for two lines, in detail, by a pitch Dh 2·Da) of approximately 84.7 µm. Note that each of a plurality of rectangular elements 702, 702, . . . constituting the main-scanning line 700 by one laser beam B1' in FIG. 10 represents an irradiation position of the laser beam B2' for forming a latent image for one pixel. This is also true for a plurality of rectangular elements 802, 802, . . . constituting the main-scanning line 800 by the other laser beam B1'.

In short, when the resolution in the sub-scanning direction is 600 dpi, the second comparative example also provides an exposure processing speed equivalent to that of the first embodiment, which in turn provides a processing speed equivalent to that of the first embodiment.

However, in the second comparative example, in order to have the resolution of 1200 dpi in the sub-scanning direction, it is necessary to lower the scanning speed in the sub-scanning direction to ¼ as compared with a case where the resolution in the sub-scanning direction is 600 dpi. On the other hand, according to the first embodiment, when the resolution in the sub-scanning direction is 1200 dpi as described above, the scanning speed in the sub-scanning direction is ½ of that when the resolution in the sub-scanning direction is 600 dpi.

Figure 11:
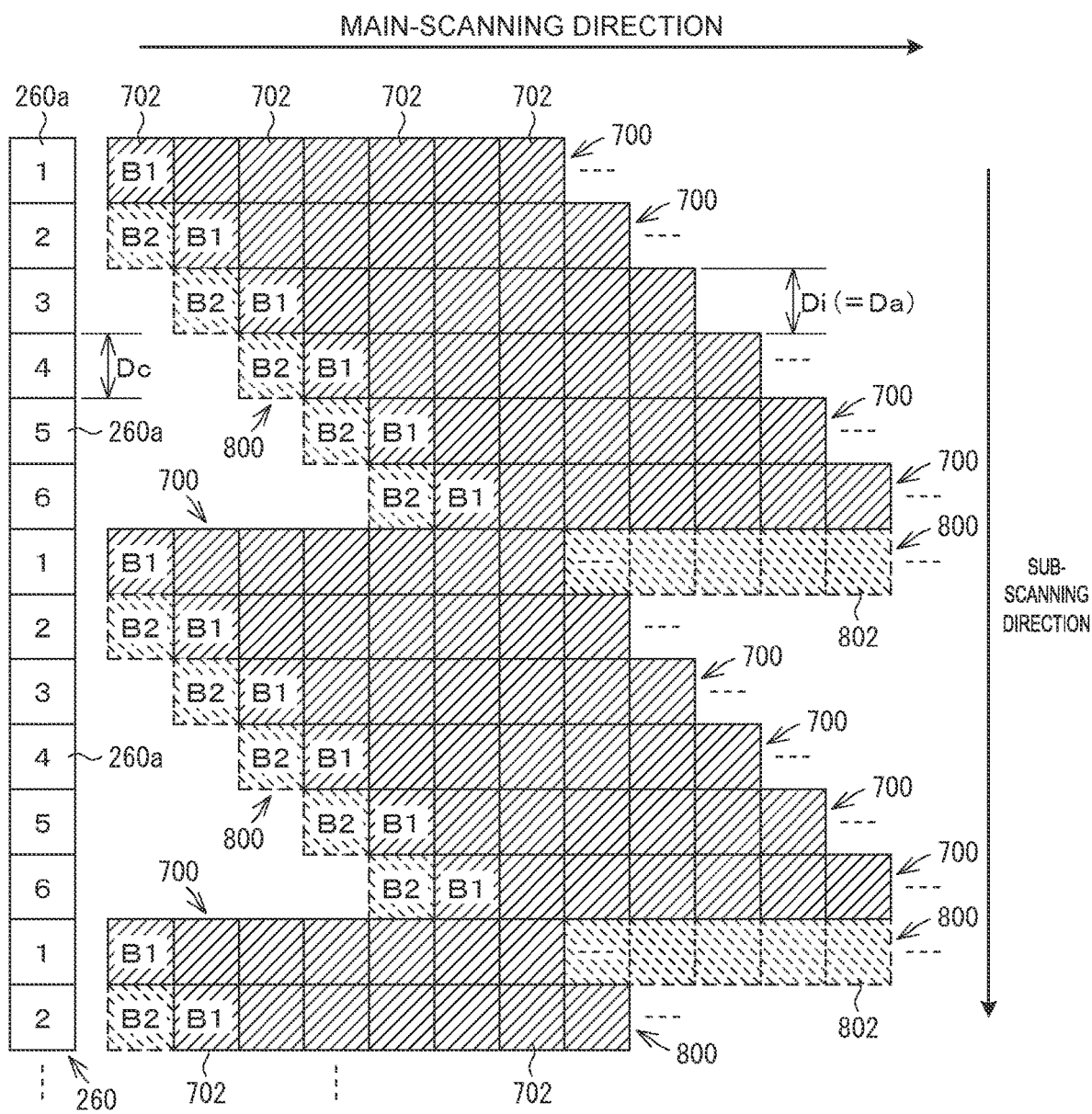
FIG. 11 is a diagram for explaining the optical scanning procedure when a scanning speed in the sub-scanning direction in the second comparative example is lowered to ½ when the resolution in the sub-scanning direction is normal resolution.

For example, in the second comparative example, assume that the scanning speed in the sub-scanning direction is simply lowered to ½ of that when the resolution in the sub-scanning direction is 600 dpi. The exposure procedure at this time is illustrated in the figure as shown in FIG. 11. As shown in this FIG. 11, when the scanning speed in the sub-scanning direction is simply lowered to ½ of that when the resolution in the sub-scanning direction is 600 dpi, the main-scanning lines 700 and 800 for two lines are formed by one session of scanning in the main-scanning direction by one reflecting surface 260*a* of the polygon mirror 260. On the other hand, each time one session of scanning in the main-scanning direction is performed, the positions of the main-scanning lines 700 and 800 move in the sub-scanning direction only for one line, that is, at a pitch Di (=Da) of approximately 42.3 µm. As a result, the respective irradiation positions of the two laser beams B1' and B2' overlap each other. Therefore, it is necessary to disable the operation of the output source of either of the two laser beams B1' and B2'. Note that FIG. 11 shows a state in which the operation of the output source of the laser beam B2' is disabled, that is, the laser beam B2' is not emitted. Then, in the exposure procedure shown in FIG. 11, the resolution in the sub-scanning direction is only 600 dpi, which is not different from the first comparative example in which the exposure procedure shown in FIG. 8 is presented. This makes employment of the 2-beam type laser diode as the light source completely pointless.

Figure 12:
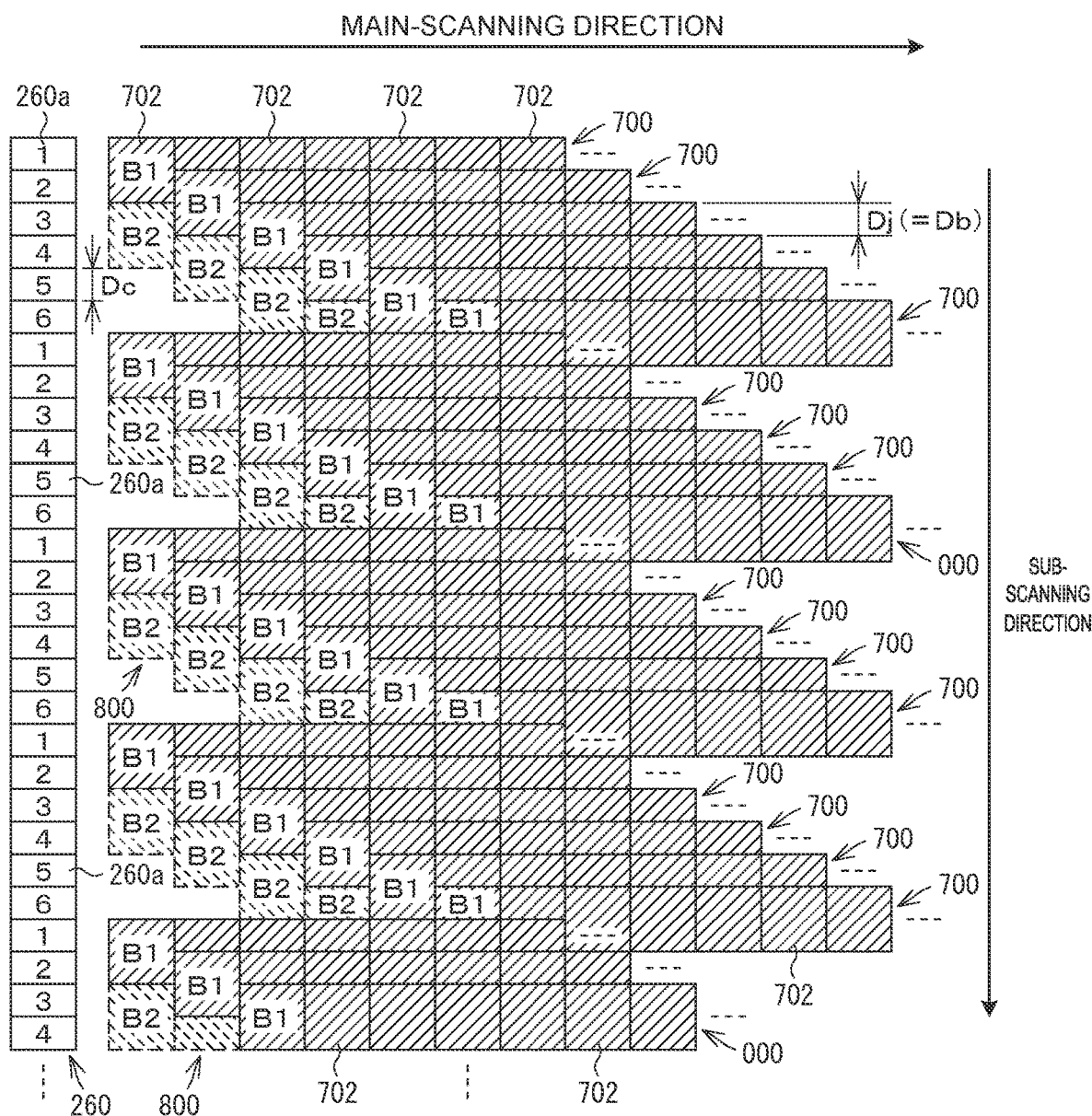
FIG. 12 is a diagram for explaining the optical scanning procedure when the resolution in the sub-scanning direction in the second comparative example is high resolution.

Therefore, in the second comparative example, in order to have the resolution of 1200 dpi in the sub-scanning direction, it is necessary to lower the scanning speed in the sub-scanning direction to ¼ of that when the resolution in the sub-scanning direction is 600 dpi, as described above. The exposure procedure at this time is illustrated in the figure as shown in FIG. 12. As shown in this FIG. 12, when the scanning speed in the sub-scanning direction is lowered to ¼ of that when the resolution in the sub-scanning direction is 600 dpi, too, the main-scanning lines 700 and 800 for two lines are formed by one session of scanning in the main-scanning direction by one reflecting surface 260a of the polygon mirror 260. Then, each time one session of scanning in the main-scanning direction is performed, the positions of the main-scanning lines 700 and 800 move in the sub-scanning direction for one line, that is, at a pitch Dj (=Db) of approximately 21.2 µm. In addition, since the respective irradiation positions of the two laser beams B1' and B2' overlap each other, the operation of the output source of either of these two laser beams B1' and B2' is disabled, or the operation of the output source of the laser beam B2' is disabled, for example. As a result, the exposure processing with high resolution of 1200 dpi in the sub-scanning direction is realized.

As described above, in the second comparative example, in order to have the resolution of 1200 dpi in the sub-scanning direction, it is necessary to lower the scanning speed in the sub-scanning direction to ¼ as compared with a case where the resolution in the sub-scanning direction is 600 dpi. On the other hand, according to the first embodiment, when the resolution in the sub-scanning direction is 1200 dpi as described above, the scanning speed in the sub-scanning direction is ½ of that when the resolution in the sub-scanning direction is 600 dpi. In short, according to the first embodiment, when the resolution in the sub-scanning direction is high resolution of 1200 dpi, the degree of lowering of the scanning speed in the sub-scanning direction can be suppressed as compared with the second comparative example, or in other words, the degree of lowering of the exposure processing speed can be suppressed, and thus the degree of lowering of the processing speed can be suppressed.

As can be seen from the above description, according to the first embodiment, resolution in the sub-scanning direction can be switched between two resolutions, that is, normal resolution of 600 dpi and high resolution of 1200 dpi, and the degree of lowering of the exposure processing speed when the resolution is 1200 dpi can be suppressed. Moreover, according to the first embodiment, an optical element for switching resolution and a drive device for inserting and removing the optical element as in the technology disclosed in Patent Literature 1 above are not needed, and employment of a light source having a larger number of light-emitting elements than a 2-beam type laser diode is not needed, either. That is, according to the first embodiment, the degree of lowering in the exposure processing speed due to the increase in the resolution in the sub-scanning direction can be suppressed, and this can be realized with a relatively simple and inexpensive configuration.

Note that, in the first embodiment, the operation of each of the first light-emitting element 202a, the second light-emitting element 202b, and the third light-emitting element 204a is individually enabled or disabled by the laser drive circuit, not shown, and the laser drive circuit is controlled by the CPU 16a. The CPU 16a, which is responsible for the control of the laser drive circuit as above, or strictly speaking, the configuration of combination of the laser drive circuit and the CPU 16a is an example of the light-emission controller according to the present invention. In addition, as for the rotational speed of the photosensitive drum 14a, too, the CPU 16a is responsible for control thereof, and the CPU 16a, which is responsible for controlling the rotational speed of the photosensitive drum 14a, also functions as a speed controller so to speak.

Moreover, in the first embodiment, a moving speed of the photosensitive surface of the photosensitive drum 14a in the sub-scanning direction when the resolution in the sub-scanning direction is 600 dpi is an example of the first speed according to the present invention. And the moving speed of the photosensitive surface of the photosensitive drum 14a in the sub-scanning direction when the resolution in the sub-scanning direction is 1200 dpi is an example of the second speed according to the present invention.

Moreover, the mutual distance Da in the sub-scanning direction between each of the irradiation positions of the first laser beam B1 and the second laser beam B2 with respect to the photosensitive surface of the photosensitive drum 14a, that is, a value of approximately 42.3 µm, is an example of the first distance according to the present invention. And the mutual distance Db in the sub-scanning direction between each of the irradiation positions of the first laser beam B1 and the third laser beam CB with respect to the photosensitive surface of the photosensitive drum 14a, that is, a value of approximately 21.2 µm, is an example of the second distance according to the present invention.

Additionally, the first laser diode 202 is an example of the first light source according to the present invention. The first laser beam B1 and the second laser beam B2 emitted from the first laser diode 202 (the first light-emitting element 202a and the second light-emitting element 202b) are examples of the first light-source beam according to the present invention. In addition, the second laser diode 204 is an example of the second light source according to the present invention. And the third laser beam CB emitted from the second laser diode 204 (third light-emitting element 204a) is an example of the second light-source beam according to the present invention.

Moreover, the polarizing beam splitter 230 is an example of the characteristic plane according to the present invention. And the boundary surface 230a of the polarizing beam splitter 230 is an example of a characteristic planar surface according to the present invention. Additionally, the planar mirror 240 is an example of a guider according to the present invention. That is, the polarizing beam splitter 230 and the planar mirror 240 constitute an example of the optical system according to the present invention. Another planar mirror 250 also constitutes an example of the optical system according to the present invention.

In the first embodiment, the first laser diode 202 is a P-wave light source and the second laser diode 204 is an S-wave light source, but these may be vice versa. That is, the first laser diode 202 may be used as an S-wave light source and the second laser diode 204 may be used as a P-wave light source. In this case, the one having optical characteristics opposite to that in the first embodiment is employed as the polarizing beam splitter 230. That is, the one having optical characteristics of transmitting an S wave and reflecting a P wave is employed as the polarizing beam splitter 230.

Moreover, the first laser diode 202 may include one of the first light-emitting element 202a and the second light-emitting element 202b, and the third light-emitting element 204a. The second laser diode 204 may then include the other of the first light-emitting element 202a and the second light-emitting element 202b. On the contrary, the second laser diode 204 may include one of the first light-emitting element 202a and the second light-emitting element 202b, and the third light-emitting element 204a. The first laser diode 202 may then include the other of the first light-emitting element 202a and the second light-emitting element 202b. In any case, the one having appropriate optical characteristics is employed as the polarizing beam splitter 230.

Moreover, in the first embodiment, the first laser diode 202 and the second laser diode 204 are disposed adjacent to each other on the same plane along the horizontal direction, or in other words, adjacent to each other on a virtual plane along the main-scanning direction. This is extremely advantageous in mounting of the first laser diode 202 and the second laser diode 204, particularly in adjusting a mounting position and orientation of the both.

Second Embodiment

Next, a second embodiment of the present invention will be described.

Figure 13:
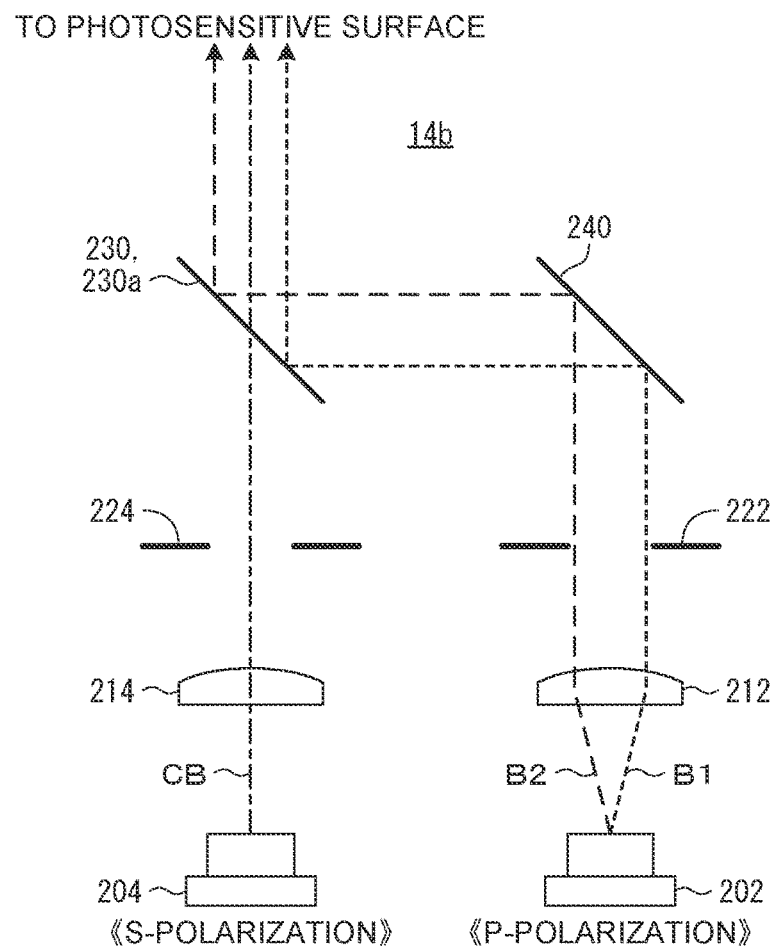
FIG. 13 is a view schematically illustrating a configuration of a part of an optical scanning device in a second embodiment of the present invention and an irradiation state of each laser beam to the photosensitive surface of the photosensitive drum.

In the second embodiment, as compared with the first embodiment, the positions of the first laser diode 202 and the second laser diode 204 are switched, as shown in FIG. 13. In addition, as the polarizing beam splitter 230, the one having optical characteristics opposite to that in the first embodiment, that is, the one having optical characteristics of transmitting an S wave and reflecting a P wave, is employed. Note that, in FIG. 13, the collimating lens 212 and the aperture 222 on the first laser diode 202 side and the collimating lens 214 and the aperture 224 on the second laser diode 204 side are also switched, but if they have the same specifications, they do not have to be switched. Constitutions other than the above in the second embodiment are the same as those in the first embodiment.

The second embodiment as above also exerts the same actions and effects as those in the first embodiment. That is, according to the second embodiment, too, the degree of lowering of the exposure processing speed due to the increase in the resolution in the sub-scanning direction can be suppressed, and this can be realized with a relatively simple and inexpensive configuration.

Note that, in the second embodiment, too, the first laser diode 202 may be used as an S-wave light source and the second laser diode 204 may be used as a P-wave light source. In this case, the one having the optical characteristics of transmitting a P wave and reflecting an S wave is employed as the polarizing beam splitter 230.

Moreover, the first laser diode 202 may include one of the first light-emitting element 202a and the second light-emitting element 202b, and the third light-emitting element 204a. The second laser diode 204 may then include the other of the first light-emitting element 202a and the second light-emitting element 202b. On the contrary, the second laser diode 204 may include one of the first light-emitting element 202a and the second light-emitting element 202b, and the third light-emitting element 204a. The first laser diode 202 may then include the other of the first light-emitting element 202a and the second light-emitting element 202b. In any case, the one having appropriate optical characteristics is employed as the polarizing beam splitter 230.

Third Embodiment

Next, a third embodiment of the present invention will be described.

In the third embodiment, as shown in FIG. 14, two laser diodes of the 1-beam type, that is, a third laser diode 206 and a fourth laser diode 208 are provided in place of the first laser diode 202 in the second embodiment, for example. The third laser diode 206 is a 1-beam type P-wave light source, that is, it has a light-emitting element 206a that emits a P-wave laser beam. The fourth laser diode 208 is also a 1-beam type P-wave light source, that is, it has a light-emitting element 208a that emits a P-wave laser beam. The laser beam emitted from the light-emitting element 206a of the third laser diode 206 is treated as the first laser beam B1, and the laser beam emitted from the light-emitting element 208a of the fourth laser diode 208 is treated as the second laser beam B2. In addition, a collimating lens 216 and an aperture 226 are provided correspondingly to the third laser diode 206, and the collimating lens 216 and the aperture 226 are provided correspondingly to the fourth laser diode 208.

Additionally, regarding the second laser beam B2, after being reflected by a half mirror 280, the second laser beam B2 is incident to the boundary surface 230a of the polarizing beam splitter 230, that is, the half mirror 280 is provided so that it does so. And regarding the first laser beam B1, after being reflected by a planar mirror (total reflection mirror) 290, the first laser beam B1 is incident to the boundary surface 230a of the polarizing beam splitter 230 through the half mirror 280, that is, the planar mirror 290 is provided so that it does so. Moreover, with the half mirror 280 interposed, an output of the third laser diode 206 (light-emitting element 206a), which is an output source of the first laser beam B1, and an output of the fourth laser diode 208 (light-emitting element 208a), which is an output source of the second laser beam B2, are appropriately increased, respectively.

The figure enclosed by a two-dot chained rectangular frame δ is a view of the light-emitting element 206a of the third laser diode 206, or strictly speaking, a light-emitting point of the light-emitting element 206a, seen from the direction opposite to the direction in which the first laser beam B1 is emitted (lower side in the central figure of FIG. 14). The figure enclosed by a two-dot chained rectangular frame ε is a view of the light-emitting element 208a of the fourth laser diode 208, or strictly speaking, a light-emitting point of the light-emitting element 208a, seen from the direction opposite to the direction in which the second laser beam B2 is emitted (lower side in the central figure of FIG. 14). Constitutions other than the above in the third embodiment are the same as those in the second embodiment, that is, as those in the first embodiment.

By means of the third embodiment as above, too, that is, by the configuration in which the first laser beam B1, the second laser beam B2, and the third laser beam CB are emitted from separate light sources, that is, the third laser diode 206, the fourth laser diode 208, and the second laser diode 204, respectively, the same actions and effects are exerted as in the first embodiment. That is, according to the third embodiment, too, the degree of lowering of the exposure processing speed due to the increase in the resolution in the sub-scanning direction can be suppressed, and this can be realized with a relatively simple and inexpensive configuration.

Note that, in the third embodiment, too, the relationship between the P wave and the S wave may be vice versa. That is, the first laser beam B1 and the second laser beam B2 may be an S-wave, and the third laser beam CB may be a P-wave. In this case, the one having the optical characteristics of transmitting a P wave and reflecting an S wave is employed as the polarizing beam splitter 230.

Moreover, the positions of the second laser diode 204, the third laser diode 206, and the fourth laser diode 208 may be switched as appropriate. In this case, too, the one having appropriate optical characteristics is employed as the polarizing beam splitter 230.

Other Application Examples

Each of the above embodiments is a specific example of the present invention and does not limit the technical scope of the present invention. The present invention is also applicable to aspects other than each of these embodiments.

For example, the polarizing beam splitter 230 is not limited to a cube-shaped one, but may be of other shapes such as a planar one. As for the polygon mirror 260, not only a hexahedron mirror but also a polyhedron mirror having a number of faces other than six may be employed. In addition, other methods of a deflector such as a galvanometer scanner may be employed in place of the polygon mirror 260. Additionally, the configuration of the optical system 200 including the polygon mirror 260 is not limited to the configuration described in the first embodiment.

Moreover, the resolution in the sub-scanning direction is not limited to the normal resolution of 600 dpi and the high resolution of 1200 dpi, although these resolutions are illustrated as examples. In extreme cases, a ratio of the two resolutions may not be a one-to-two relationship, such as 600 dpi and 1200 dpi, but may be any other relationship.

In addition, the present invention can be applied to a configuration in which a planar (endless band-shaped) one such as a photosensitive belt is employed as a latent image carrier, instead of a cylindrical photosensitive drum 14a.

And the present invention can be applied not only to the multifunctional printer 10 but also to image forming apparatuses other than the multifunctional printer 10, such as copiers and printers.

Moreover, the present invention can also be provided as an optical scanning device or as an optical scanning method.

What is claimed is:

1. An optical scanning device, comprising:
a first light-emitting element that emits a first light beam; a second light-emitting element that emits a second light beam; and a third light-emitting element that emits a third light beam;
a deflector that deflects each of the first light beam, the second light beam, and the third light beam so that a scanned surface of a latent image carrier is scanned in a main-scanning direction with each of the first light beam, the second light beam and the third light beam; and
a light-emission controller that individually enables or disables an operation of each of the first light-emitting element, the second light-emitting element, and the third light-emitting element, wherein
a moving speed of the scanned surface in a sub-scanning direction is selectively controlled to be either one of a first speed and a second speed which is lower than the first speed;
the first light-emitting element and the second light-emitting element are disposed such that a mutual distance in the sub-scanning direction between a scanning position of the first light beam and a scanning position of the second light beam on the scanned surface is a first distance corresponding to the first speed;
the third light-emitting element is disposed such that a mutual distance in the sub-scanning direction between the scanning position of the first light beam and a scanning position of the third light beam on the scanned surface is a second distance corresponding to the second speed; and
when the moving speed of the scanned surface in the sub-scanning direction is the first speed, the light-emission controller enables the operation of each of the first light-emitting element and the second light-emitting element and disables the operation of the third light-emitting element, and when the moving speed of the scanned surface in the sub-scanning direction is the second speed, the light-emission controller enables the operation of each of the first light-emitting element and the third light-emitting element and disables the operation of the second light-emitting element.

2. The optical scanning device according to claim 1, wherein
two of the first light-emitting element, the second light-emitting element, and the third light-emitting element are provided in one first light source; and
the remaining one of the first light-emitting element, the second light-emitting element, and the third light-emitting element is provided in a second light source which is different from the first light source.

3. The optical scanning device according to claim 2, wherein
one of the first light source and the second light source is a P-wave light source; and
the other of the first light source and the second light source is an S-wave light source.

4. The optical scanning device according to claim 3, wherein
the first light source and the second light source are provided adjacent to each other in a virtual plane along the main-scanning direction.

5. The optical scanning device according to claim 3, further comprising:
an optical system which guides, to the deflector, a first light-source beam emitted from the first light source among the first light beam, the second light beam, and the third light beam and a second light-source beam emitted from the second light source among the first light beam, the second light beam, and the third light beam, wherein
the optical system includes:
a characteristic plane having a characteristic planar surface having a characteristics of transmitting one of the first light-source beam and the second light-source beam and of reflecting the other of the first light-source beam and the second light-source beam; and
a guider which guides at least one of the first light-source beam and the second light-source beam to the characteristic planar surface so that the first light-source beam and the second light-source beam are incident from sides opposite to each other with respect to the characteristic planar surface and emitted to the same direction as each other from the characteristic planar surface; and
the first light-source beam and the second light-source beam emitted from the characteristic planar surface are guided to the deflector.

6. The optical scanning device according to claim 1, wherein
the first light-emitting element, the second light-emitting element, and the third light-emitting element are provided in separate light sources, respectively.

7. The optical scanning device according to claim 1, wherein
the second speed is ½ of the first speed; and
the second distance is ½ of the first distance.

8. The optical scanning device according to claim 7, wherein
the first light-emitting element, the second light-emitting element, and the third light-emitting element are disposed so that a scanning position of the third light beam on the scanned surface in the sub-scanning direction is at an intermediate position between the scanning position of the first light beam and the scanning position of the second light beam.

9. An image forming apparatus, comprising the optical scanning device according to claim 1.

10. An optical scanning method comprising:
deflecting of each of a first light beam, a second light beam, and a third light beam so that a scanned surface of a latent image carrier is scanned in a main-scanning direction with each of the first light beam emitted from a first light-emitting element, the second light beam emitted from a second light-emitting element, and the third light beam emitted from a third light-emitting element; and
light-emission controlling of individually enabling or disabling an operation of each of the first light-emitting element, the second light-emitting element, and the third light-emitting element, wherein
a moving speed of the scanned surface in a sub-scanning direction is selectively controlled to either one of a first speed and a second speed which is lower than the first speed;
the first light-emitting element and the second light-emitting element are disposed such that a mutual distance in the sub-scanning direction between a scanning position of the first light beam and a scanning position of the second light beam on the scanned surface is a first distance according to the first speed;
the third light-emitting element is disposed such that a mutual distance in the sub-scanning direction between the scanning position of the first light beam and a scanning position of the third light beam on the scanned surface is a second distance according to the second speed;
at the light-emission controlling, when the moving speed of the scanned surface in the sub-scanning direction is the first speed, the operation of each of the first light-emitting element and the second light-emitting element is enabled and the operation of the third light-emitting element is disabled, and when the moving speed of the scanned surface in the sub-scanning direction is the second speed, the operation of each of the first light-emitting element and the third light-emitting element is enabled and the operation of the second light-emitting element is disabled.

* * * * *